United States Patent
Rapp et al.

(10) Patent No.: US 11,537,668 B2
(45) Date of Patent: Dec. 27, 2022

(54) USING A MACHINE LEARNING SYSTEM TO PROCESS A CORPUS OF DOCUMENTS ASSOCIATED WITH A USER TO DETERMINE A USER-SPECIFIC AND/OR PROCESS-SPECIFIC CONSEQUENCE INDEX

(71) Applicant: Proofpoint, Inc., Sunnyvale, CA (US)

(72) Inventors: Daniel Wallace Rapp, Highland, UT (US); Brian Sanford Jones, Cary, NC (US); Spencer Bror Koehler, Sandy, UT (US)

(73) Assignee: Proofpoint, Inc., Sunnyvale, CA (US)

( * ) Notice: Subject to any disclaimer, the term of this patent is extended or adjusted under 35 U.S.C. 154(b) by 330 days.

(21) Appl. No.: 16/846,696

(22) Filed: Apr. 13, 2020

(65) Prior Publication Data

US 2021/0049516 A1 Feb. 18, 2021

Related U.S. Application Data

(60) Provisional application No. 62/886,679, filed on Aug. 14, 2019.

(51) Int. Cl.
*G06F 16/00* (2019.01)
*G06F 16/93* (2019.01)
*G06N 20/20* (2019.01)
*G06Q 50/18* (2012.01)

(52) U.S. Cl.
CPC .......... *G06F 16/93* (2019.01); *G06N 20/20* (2019.01); *G06Q 50/18* (2013.01)

(58) Field of Classification Search
CPC ....... G06F 16/355; G06F 16/93; G06N 20/00; G06N 20/20; G06Q 50/18

USPC ................ 707/600–899; 706/1–62
See application file for complete search history.

(56) References Cited

U.S. PATENT DOCUMENTS

| | | | |
|---|---|---|---|
| 10,963,842 B1* | 3/2021 | Resheff | G06Q 10/107 |
| 2014/0156567 A1* | 6/2014 | Scholtes | G06N 5/02 |
| | | | 706/12 |
| 2017/0187739 A1* | 6/2017 | Spiro | G06F 3/0482 |
| 2017/0357909 A1* | 12/2017 | Willamowski | G06N 20/00 |
| 2018/0349388 A1* | 12/2018 | Skiles | G06N 20/10 |
| 2019/0068627 A1* | 2/2019 | Thampy | H04W 12/12 |
| 2020/0034752 A1* | 1/2020 | Luo | G06N 20/00 |
| 2020/0265270 A1* | 8/2020 | Boudreau | G06K 9/6257 |

* cited by examiner

*Primary Examiner* — Michelle N Owyang
(74) *Attorney, Agent, or Firm* — Banner & Witcoff, Ltd.

(57) ABSTRACT

Aspects of the disclosure relate to using a machine learning system to process a corpus of documents associated with a user to determine a user-specific consequence index. A computing platform may load a corpus of documents associated with a user. Subsequently, the computing platform may create a first plurality of smart groups based on the corpus of documents, and then may generate a first user interface comprising a representation of the first plurality of smart groups. Next, the computing platform may receive user input applying one or more labels to a plurality of documents associated with at least one smart group. Subsequently, the computing platform may create a second plurality of smart groups based on the corpus of documents and the received user input. Then, the computing platform may generate a second user interface comprising a representation of the second plurality of smart groups.

18 Claims, 33 Drawing Sheets

Person-Centric Investigation Platform

SMART GROUPS | CLASSES | LABEL

| NLP | ENTITY | NLP | PRE-DEFINED | PRE-DEFINED | NLP | NLP | NLP |
|---|---|---|---|---|---|---|---|
| 80 Docs 73.96 Cohesion | 74 Docs 73.92 Cohesion | 64 Docs 73.49 Cohesion | 40 Docs 66.18 Cohesion | 30 Docs 68.71 Cohesion | 18 Docs 79.11 Cohesion | 13 Docs 89.58 Cohesion | 13 Docs 85.64 Cohesion |
| "sysops weekly report submitted by" in text | Date entity of "This week" | "sysops weekly report" in title | Pricing terms in text | Amounts over 1K in text | "re weekly update" in subject | "prod cormorant vpc buildout phase" in title | "im025034 re failed hsm" in subject |

| ENTITY | ENTITY | CLUSTERING | CLUSTERING | ENTITY |
|---|---|---|---|---|
| 12 Docs 99.25 Cohesion | 6 Docs 90.08 Cohesion | 6 Docs 99.72 Cohesion | 175 Docs 59.26 Cohesion | 207 Docs 58.48 Cohesion |
| 13 shared entity type values | 39 shared entity text values | 11 shared clustered values | clustered in "auto group #1" | Company or Organization in text |

( To Do 221 )

[ NEW SMART GROUPS ]

| | | |
|---|---|---|
| Person-Centric Investigation Platform | | |
| SMART GROUPS | CLASSES | LABEL |

| | TITLE | SUBJECT |
|---|---|---|
| ☐ | (EXT) | |
| ☐ | (docx) Instructions | Re: Weekly update |
| ☐ | (docx) Instructions | Weekly Report |
| ☐ | (docx) Instructions | Re: Weekly report |
| ☐ | (docx) Instructions | Weekly Update |
| ☐ | (docx) Instructions | Re: Weekly update w_e 20_01_17 |
| ☐ | (docx) Instructions | Weekly Update |
| ☐ | (docx) Instructions | Weekly! |
| ☐ | (docx) Instructions | Re: Weekly update |
| ☐ | (docx) Instructions | Weekly update |
| ☐ | (docx) Instructions | Re: Week ending report- First of 2017!!! |
| ☐ | (docx) Instructions | Weekly Update |
| ☐ | (docx) Instructions | Weekly |
| ☐ | (docx) Instructions | Weekly! |
| ☐ | (docx) Instructions | Weekly |
| ☐ | (docx) Instructions | Re: Weekly update w_e 20_01_17 |
| ☐ | (docx) SysOps Weekly Report | Weekly report |
| ☐ | (docx) SysOps Weekly Report | Weekly update |
| ☐ | (docx) SysOps Weekly Report | Weekly update w_e 20_01 |

Sensitive ▼ [LABEL]                                    [CREATE LABEL]

Person-Centric Investigation Platform

SMART GROUPS    CLASSES    LABEL

| | TITLE | SUBJECT |
|---|---|---|
| ▶ | (EXT) Instructions | Re: Weekly update |
| ▶ | (docx) Instructions | Weekly Report |
| ▶ | (docx) Instructions | Re: Weekly report |
| ▶ | (docx) Instructions | Weekly Update |
| ▶ | (docx) Instructions | Re: Weekly update w_e 20_01_17 |
| ▶ | (docx) Instructions | Weekly Update |
| ▶ | (docx) Instructions | Weekly! |
| ▶ | (docx) Instructions | Re: Weekly update |
| ▶ | (docx) Instructions | Weekly update |
| ▶ | (docx) Instructions | Re: Week ending report- First of 2017!!! |
| ▶ | (docx) Instructions | Weekly Update |
| ▶ | (docx) Instructions | Weekly |
| ▶ | (docx) Instructions | Weekly! |
| ▶ | (docx) Instructions | Weekly |
| ▶ | (docx) Instructions | Re: Weekly update |
| ▶ | (docx) SysOps Weekly Report | Re: Weekly update w_e 20_01_17 |
| ▶ | (docx) SysOps Weekly Report | Weekly report |
| ▶ | (docx) SysOps Weekly Report | Weekly update |
| ▶ | (docx) SysOps Weekly Report | Weekly update w_e 20_01 |

Ignore ▸ [LABEL]      [CREATE LABEL]

FIG. 6

Person-Centric Investigation Platform

SMART GROUPS    CLASSES    LABEL

| PRE-DEFINED | PRE-DEFINED | NLP | NLP | ENTITY | ENTITY | CLUSTERING | CLUSTERING |
|---|---|---|---|---|---|---|---|
| 40 Docs | 30 Docs | 13 Docs | 13 Docs | 12 Docs | 6 Docs | 6 Docs | 95 Docs |
| 66.18 Cohesion | 68.71 Cohesion | 89.58 Cohesion | 85.64 Cohesion | 99.25 Cohesion | 90.08 Cohesion | 99.72 Cohesion | 56.26 Cohesion |
| Pricing terms in text | Amounts over 1K in text | "prod cormorant vpc buildout phase" in title | "im025034 re failed hsm" in subject | 13 shared entity type values | 39 shared entity text values | 11 shared clustered values | clustered in "auto group #1" |

| ENTITY |
|---|
| 127 Docs |
| 57.14 Cohesion |
| Company or Organization in text |

( To Do 141 )

( Ignore 80 )

[ NEW SMART GROUPS ]

FIG. 7

| Person-Centric Investigation Platform | | | |
|---|---|---|---|
| SMART GROUPS | CLASSES | LABEL | |
| | | (EXT) TITLE | SUBJECT |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |
| | | ☐ (pdf) Tax Invoice Receipt | Confirmation of your Atlassian order AT- |

Sensitive ▾ [LABEL]    [CREATE LABEL]

Person-Centric Investigation Platform

SMART GROUPS | CLASSES | LABEL

| PRE-DEFINED | PRE-DEFINED | NLP | NLP | ENTITY | CLUSTERING | CLUSTERING | ENTITY |
|---|---|---|---|---|---|---|---|
| 28 Docs | 18 Docs | 13 Docs | 13 Docs | 6 Docs | 6 Docs | 95 Docs | 115 Docs |
| 66.82 Cohesion | 70.14 Cohesion | 89.58 Cohesion | 85.64 Cohesion | 90.08 Cohesion | 99.72 Cohesion | 56.26 Cohesion | 56.75 Cohesion |
| Pricing terms in text | Amounts over 1K in text | "prod cormorant vpc buildout phase" in title | "im025034 re failed hsm" in subject | 39 shared entity type values | 11 shared clustered values | clustered in "auto group #1" | Company or Organization in text |

(Ignore 80)  (To Do 129)  (Financial 12)

[NEW SMART GROUPS]

Person-Centric Investigation Platform

| SMART GROUPS | CLASSES | LABEL | | SUBJECT |
|---|---|---|---|---|
| | | ▶ | (EXT) TITLE | |
| | | ▶ | (pdf) OnSIP Invoice | Success! Your OnSIP Invoices |
| | | ▶ | (pdf) OnSIP Invoice | Success! Your OnSIP Invoices |
| | | ▶ | (pdf) OnSIP Invoice | Success! Your OnSIP Invoices |
| | | ▶ | (pdf) OnSIP Invoice | Success! Your OnSIP Invoices |
| | | ▶ | (pdf) OnSIP Invoice | Success! Your OnSIP Invoices |
| | | ▶ | (pdf) OnSIP Invoice | Success! Your OnSIP Invoices |

Ignore
Financial
Sensitive    [LABEL]                                    [CREATE LABEL]

Person-Centric Investigation Platform

SMART GROUPS    CLASSES    LABEL

| | TITLE | SUBJECT |
|---|---|---|
| ▶ | (EXT) | |
| ▶ | (pdf) Ensure your form is accepted by followin | 2017 Wellness Point Program - Q1 Biometr |
| ▶ | (pdf) Ensure your form is accepted by followin | 2017 Wellness Point Program - Q2 Biometr |
| ▶ | (pdf) Ensure your form is accepted by followin | 2017 Wellness Point Program - Q2 Biometr |
| ▶ | (pdf) Ensure your form is accepted by followin | FW: 2017 Wellness Point Program - Q1 Bio |
| ▶ | (pdf) Ensure your form is accepted by followin | Reminder: Q1 Biometric Screening Event |
| ▶ | (pdf) Ensure your form is accepted by followin | Reminder: Q2 Biometric Screening Event |

Ignore
Financial
Cormorant
Sensitive    LABEL

CREATE LABEL

FIG. 14

Person-Centric Investigation Platform

SMART GROUPS    CLASSES    LABEL

| PRE-DEFINED | PRE-DEFINED | NLP | CLUSTERING | ENTITY |
|---|---|---|---|---|
| 22 Docs<br>68.94 Cohesion | 18 Docs<br>70.14 Cohesion | 13 Docs<br>85.64 Cohesion | 87 Docs<br>56.12 Cohesion | 90 Docs<br>57.89 Cohesion |
| Pricing terms in text | Amounts over 1K in text | "im025034 re failed hsm" in subject | clustered in "auto group #1" | Company or Organization in text |

(Ignore 86)  (To Do 104)  (Cormorant 13)
(Financial 18)

[NEW SMART GROUPS]

| Person-Centric Investigation Platform | | | |
|---|---|---|---|
| SMART GROUPS | CLASSES | LABEL | |
| | | (EXT) TITLE | SUBJECT |
| | | ▸ (pdf) | FW: IM025D04 RE: Failed HSM unit S_N 35 |
| | | ▸ (pdf) | FW: IM025D04 RE: Failed HSM unit S_N 35 |
| | | ▸ (pdf) | RE: IM025D04 RE: Failed HSM unit S_N 35 |
| | | ▸ (pdf) | RE: IM025D04 RE: Failed HSM unit S_N 35 |
| | | ▸ (pdf) | RE: IM025D04 RE: Failed HSM unit S_N 35 |
| | | ▸ (pdf) | RE: IM025D04 RE: Failed HSM unit S_N 35 |
| | | ▸ (pdf) | Re: FW: IM025D04 RE: Failed HSM unit S_ |
| | | ▸ (pdf) | RE: IM025D04 RE: Failed HSM unit S_N 35 |
| | | ▸ (pdf) jmac252055 PDF | RE: IM025D04 RE: Failed HSM unit S_N 35 |
| | | ▸ (pdf) jmac252056 PDF | RE: IM025D04 RE: Failed HSM unit S_N 35 |
| | | ▸ (pdf) jmac252057 PDF | RE: IM025D04 RE: Failed HSM unit S_N 35 |
| | | ▸ (pdf) jmac252058 PDF | RE: IM025D04 RE: Failed HSM unit S_N 35 |

Ignore
Financial
Cormorant
Sensitive  [LABEL]   [CREATE LABEL]

FIG. 17

Person-Centric Investigation Platform

SMART GROUPS    CLASSES    LABEL

| PRE-DEFINED | PRE-DEFINED | CLUSTERING | ENTITY |
|---|---|---|---|
| 13 Docs<br>73.79 Cohesion | 9 Docs<br>74.53 Cohesion | 74 Docs<br>55.21 Cohesion | 77 Docs<br>57.29 Cohesion |
| Pricing terms in text | Amounts over 1K in text | clustered in "auto group #1" | Company or Organization in text |

(Ignore 86)  (To Do 91)  (Financial 31)  (Cormorant 13)

NEW SMART GROUPS

FIG. 18

Person-Centric Investigation Platform

SMART GROUPS  CLASSES  LABEL

| ENTITY | CLUSTERING | CLUSTERING | CLUSTERING | CLUSTERING | ENTITY | PRE-DEFINED | NLP |
|---|---|---|---|---|---|---|---|
| 77 Docs 57.29 Cohesion | 74 Docs 55.21 Cohesion | 67 Docs 58.21 Cohesion | 33 Docs 53.26 Cohesion | 20 Docs 65.94 Cohesion | 20 Docs 64.66 Cohesion | 13 Docs 73.79 Cohesion | 9 Docs 74.53 Cohesion |
| Company or Organization in text | clustered in "auto group #1" | More like "Ignore" based on text(A) | Possibly "Ignore" based on subj+title(a) | Possibly "Financial" based on text(a) | Company or Organization entity of "CA" | Pricing terms in text | "sunnyvale ca 94089" in text |

| NLP | NLP | NLP | NLP | ENTITY |
|---|---|---|---|---|
| 7 Docs 86.32 Cohesion | 6 Docs 97.95 Cohesion | 5 Docs 74.65 Cohesion | 5 Docs 76.59 Cohesion | 5 Docs 99.99 Cohesion |
| "payable software testing services" in text | "g suite invoice is available" in subject | "content type multipart alternative" in title | "event in the" in title | 178 shared entity text values |

(Ignore 86)  (To Do 91)  (Cormorant 13)

(Financial 31)

[NEW SMART GROUPS]

Person-Centric Investigation Platform

| SMART GROUPS | CLASSES | LABEL | |
|---|---|---|---|
| | | | SUBJECT |
| ▸ (EXT) TITLE | | | |
| ▸ (pdf) | | | FW: bonus payout statement |
| ▸ (pdf) | | | bonus payout statement |
| ▸ (pdf) Billed To | | | Proofpoint Inc.: Invoice for January 20 |
| ▸ (pdf) Billed To | | | Proofpoint Inc.: Invoice for April 2017 |
| ▸ (pdf) Billed To | | | Proofpoint Inc.: Invoice for February 2 |
| ▸ (pdf) Billed To | | | Proofpoint Inc.: Invoice for January 20 |
| ▸ (pdf) Billed To | | | Proofpoint Inc.: Invoice for May 2017 |
| ▸ (pdf) Billed To | | | Proofpoint Inc.: Invoice for December 2 |
| ▸ (pdf) Billed To | | | Proofpoint Inc.: Invoice for March 2017 |
| ▸ (pdf) Invoice | | | Your G Suite Invoice is available |
| ▸ (pdf) Invoice | | | Your G Suite Invoice is available |
| ▸ (pdf) Invoice | | | Your G Suite Invoice is available |
| ▸ (pdf) Invoice | | | Your G Suite Invoice is available |
| ▸ (pdf) Invoice | | | Your G Suite Invoice is available |
| ▸ (pdf) Invoice | | | Your G Suite Invoice is available |
| ▸ (pdf) Untitled | | | Re: mobile phone bill for 2017-04 |
| ▸ (pdf) Untitled | | | mobile phone bill for 2017-01 |
| Ignore | | | mobile phone bill for 2017-02 |
| Financial | | | mobile phone bill for 2017-03 |
| Cormorant | | | |
| Sensitive | [LABEL] | | |

[CREATE LABEL]

Person-Centric Investigation Platform

SMART GROUPS | CLASSES | LABEL

| ENTITY | CLUSTERING | CLUSTERING | CLUSTERING | ENTITY | NLP | NLP | ENTITY |
|---|---|---|---|---|---|---|---|
| 57 Docs | 59 Docs | 56 Docs | 28 Docs | 7 Docs | 5 Docs | 5 Docs | 5 Docs |
| 57.29 Cohesion | 54.83 Cohesion | 58.56 Cohesion | 52.18 Cohesion | 79.21 Cohesion | 74.65 Cohesion | 76.59 Cohesion | 99.99 Cohesion |
| Company or Organization in text | clustered in "auto group #1" | More like "Ignore" based on text(A) | Possibly "Ignore" based on subj+title(a) | Company or Organization entity of "CA" | "content type multipart alternative" in title | "event in the" in title | 178 shared entity text values |

(Ignore 86)  (To Do 71)  (Financial 51)  (Cormorant 13)

[ NEW SMART GROUPS ]

FIG. 21

Person-Centric Investigation Platform

| SMART GROUPS | CLASSES | LABEL | | |
|---|---|---|---|---|
| | | (EXT) TITLE | SUBJECT | |
| | | ▶ (pdf) | Re: 2016 MBO signature | |
| | | ▶ (pdf) | 2016 MBO signature | |
| | | ▶ (pdf) | Re: Welcome to Talent Development - 2017 | |
| | | ▶ (pdf) | Sign MBO and return today | |
| | | ▶ (pdf) | Re: Sign MBO and return today | |
| | | ▶ (pdf) | Changes to the Proofpoint 401(k) Plan | |
| | | ▶ (ics) | How to Develop an Investment Strategy | |
| | | ▶ (ics) | Reminder: Workshop Today on How to Deve | |
| | | ▶ (ics) | How to Develop an Investment Strategy | |
| | | ▶ (ics) | Reminder: Workshop Today on How to Deve | |
| | | ▶ (docx) | Re: Senior IT Security Compliance Analys | |
| | | ▶ (docx) | Re: Senior IT Security Compliance Analys | |
| | | ▶ (docx) | Re: Senior IT Security Compliance Analys | |
| | | ▶ (docx) | Re: Senior IT Security Compliance Analys | |
| | | ▶ (docx) | Re: Senior IT Security Compliance Analys | |
| | | ▶ (p7m) | | |
| | | ▶ (p7m) | docker with name issue | |

Ignore
Financial
Cormorant
Sensitive

[LABEL]    [CREATE LABEL]

FIG. 22

| Person-Centric Investigation Platform | | |
|---|---|---|
| SMART GROUPS  CLASSES  LABEL | | |
| | | |

ENTITY
9 Docs
59.46 Cohesion
Company or Organization in text

CLUSTERING
11 Docs
47.75 Cohesion
clustered in "auto group #1"

CLUSTERING
9 Docs
49.05 Cohesion
Possibly "Ignore" based on subj+title(a)

(Ignore 142)   (To Do 15)   (Cormorant 13)

(Financial 51)

NEW SMART GROUPS

| Person-Centric Investigation Platform | | |
|---|---|---|
| SMART GROUPS | CLASSES | LABEL |
| ▸ (EXT) TITLE | | SUBJECT |
| ▸ (emz) JOIN NOW | | FW: Proofpoint Global Wellness Challenge |
| ▸ (emz) JOIN NOW | | Proofpoint Global Wellness Challenge - C |
| ▸ (emz) JOIN NOW | | Proofpoint Global Wellness Challenge - C |

Ignore
Financial
Cormorant
Sensitive [LABEL]

[CREATE LABEL]

FIG. 27

| Person-Centric Investigation Platform | | |
|---|---|---|
| SMART GROUPS | CLASSES | LABEL |
| ▸ (EXT) TITLE | | SUBJECT |
| ▸ (pdf) Pre Production Infra Phase 1 | | Re: Pre-Prod Infra: Project Walkthrough |
| ▸ (pdf) Pre Production Infra Phase 1 | | Re: Pre-Prod Infra: Project Walkthrough |
| ▸ (pdf) Pre Production Infra Phase 1 | | Pre-Prod Infra: Infoblox Tasks - Please |

Ignore / Financial / Cormorant / Sensitive  [LABEL]  [CREATE LABEL]

Person-Centric Investigation Platform

SMART GROUPS CLASSES LABEL

| CLUSTERING | ENTITY | NLP | ENTITY | CLUSTERING |
|---|---|---|---|---|
| 8 Docs | 6 Docs | 4 Docs | 3 Docs | 1 Docs |
| 45.56 Cohesion | 66.74 Cohesion | 75.01 Cohesion | 92.23 Cohesion | 100.00 Cohesion |
| clustered in "auto group #1" | Company or Organization in text | "2017 wellness point program" subject | Company or Organization entity of "Well-" | More like "Financial" based on text(A) |

(Ignore 145)  (To Do 9)  (Financial 51)  (Cormorant 16)

[ NEW SMART GROUPS ]

FIG. 28

Person-Centric Investigation Platform

| SMART GROUPS | CLASSES | LABEL | | |
|---|---|---|---|---|
| | | | | SUBJECT |
| ▷ | (EXT) TITLE | | | |
| ▷ | (emz) 2017 Wellness Program | | | 2017 Wellness Point Program - Q1 Biometr |
| ▷ | (emz) 2017 Wellness Program | | | FW: 2017 Wellness Point Program - Q1 Bio |
| ▷ | (txt) 1 | | | FW: Pics |
| ▷ | (emz) Pi Day 3 14 | | | Pi Day: 3.14.17 - Enjoy slice of pi an |
| ▷ | (htm) Startup finished in 481ms kernel 2 102s | | | Problem: CentOS 7 + httpd start on boot |
| ▷ | (emz) WHEN March 14th 12pm 3 14pm WHERE 892 Mu | | | Pi Day: 3.14.17 - Enjoy a slice of pi an |
| ▷ | (wmz) Wellness Point Program | | | 2017 Wellness Point Program - Q2 Biometr |
| ▷ | (wmz) Wellness Point Program | | | 2017 Wellness Point Program - Q2 Biometr |
| ▷ | (wmz) Wellness Point Program | | | Reminder: Q2 Biometric Screening Event |

Ignore
Financial
Cormorant
Sensitive [LABEL]

[CREATE LABEL]

FIG. 29

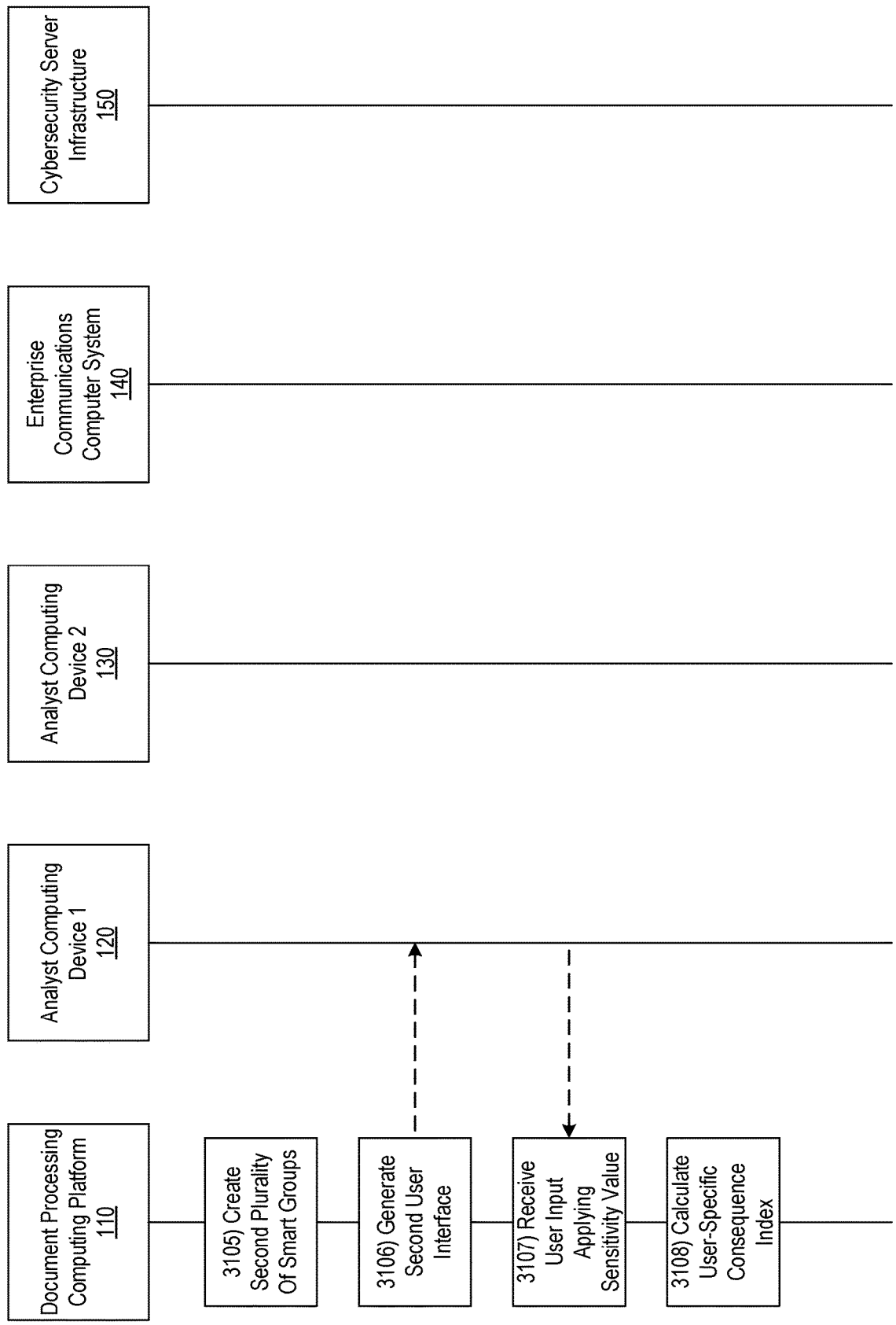

USING A MACHINE LEARNING SYSTEM TO PROCESS A CORPUS OF DOCUMENTS ASSOCIATED WITH A USER TO DETERMINE A USER-SPECIFIC AND/OR PROCESS-SPECIFIC CONSEQUENCE INDEX

CROSS-REFERENCE TO RELATED APPLICATIONS

This application claims the benefit of and priority to U.S. Provisional Patent Application Ser. No. 62/886,679, filed Aug. 14, 2019, and entitled "Using a Machine Learning System to Process a Corpus of Documents Associated with a User to Determine a User-Specific Consequence Index," which is incorporated by reference herein in its entirety.

TECHNICAL FIELD

Aspects of the disclosure relate to digital data processing systems, data processing methods, and machine learning systems. In particular, one or more aspects of the disclosure relate to using a machine learning system to process a corpus of documents associated with a user to determine a user-specific and/or process-specific index, such as a user-specific and/or process-specific consequence index.

BACKGROUND

Evaluating a large dataset, such as a corpus of documents associated with an enterprise computer user, may require a large amount of review time and/or processing power. In some instances, it may be difficult to automate and optimize such processes, as large amounts of both human resources and computing resources may be required. In addition, even when such computing resources are available, automated algorithms might not be able to manage variability in a dataset being evaluated. One or more aspects of the disclosure provide technical solutions that overcome these and/or other technical challenges.

SUMMARY

In accordance with one or more embodiments, a computing platform having at least one processor, a communication interface, and memory may load a corpus of documents associated with a user. Subsequently, the computing platform may create a first plurality of smart groups based on the corpus of documents associated with the user. In some instances, in creating the first plurality of smart groups based on the corpus of documents associated with the user, the computing platform may utilize multiple different aspects of the corpus of documents to discover latent correlations in the corpus of documents. After creating the first plurality of smart groups based on the corpus of documents associated with the user, the computing platform may generate a first user interface comprising a representation of the first plurality of smart groups. Next, the computing platform may receive user input applying one or more labels to a plurality of documents associated with at least one smart group of the first plurality of smart groups. Subsequently, the computing platform may create a second plurality of smart groups based on the corpus of documents associated with the user and the user input applying the one or more labels to the plurality of documents associated with the at least one smart group of the first plurality of smart groups. Then, the computing platform may generate a second user interface comprising a representation of the second plurality of smart groups.

In some embodiments, loading the corpus of documents associated with the user may include receiving a plurality of email messages associated with the user from an enterprise communications computer system.

In some embodiments, creating the first plurality of smart groups based on the corpus of documents associated with the user may include executing multiple unsupervised machine-learning algorithms to produce the first plurality of smart groups. In some instances, executing the multiple unsupervised machine-learning algorithms to produce the first plurality of smart groups may include executing one or more clustering algorithms.

In some embodiments, the computing platform may receive user input applying a sensitivity value to one or more documents included in the corpus of documents associated with the user. Subsequently, the computing platform may calculate a person-centric consequence index for the user based on the user input applying the sensitivity value to the one or more documents included in the corpus of documents associated with the user. In some instances, the computing platform may output the person-centric consequence index calculated for the user to an enterprise risk classification system.

In some embodiments, the computing platform may monitor user interactions involving the one or more smart groups of the first plurality of smart groups and one or more smart groups of the second plurality of smart groups. Subsequently, the computing platform may assign at least one priority value to a first set of smart groups of the one or more smart groups of the first plurality of smart groups and the one or more smart groups of the second plurality of smart groups based on the monitored user interactions.

In some embodiments, creating the second plurality of smart groups based on the corpus of documents associated with the user and the user input applying the one or more labels to the plurality of documents associated with the at least one smart group of the first plurality of smart groups may include creating one or more smart groups of the second plurality of smart groups using a supervised machine learning mechanism.

In some embodiments, the computing platform may output data associated with the second plurality of smart groups to an e-discovery platform application. In some embodiments, the computing platform may output data associated with the second plurality of smart groups to a compliance supervision application. In some embodiments, the computing platform may output data associated with the second plurality of smart groups to a malicious object or event labeling application.

BRIEF DESCRIPTION OF THE DRAWINGS

The present disclosure is illustrated by way of example and not limited in the accompanying figures in which like reference numerals indicate similar elements and in which:

FIGS. 3-30 depict illustrative user interfaces for using a machine learning system to process a corpus of documents associated with a user to determine a user-specific consequence index in accordance with one or more example embodiments; and FIGS. 31A-31C depict an illustrative event sequence for using a machine learning system to process a corpus of documents associated with a user to determine a user-specific consequence index in accordance with one or more example embodiments.

DETAILED DESCRIPTION

Figure 1:
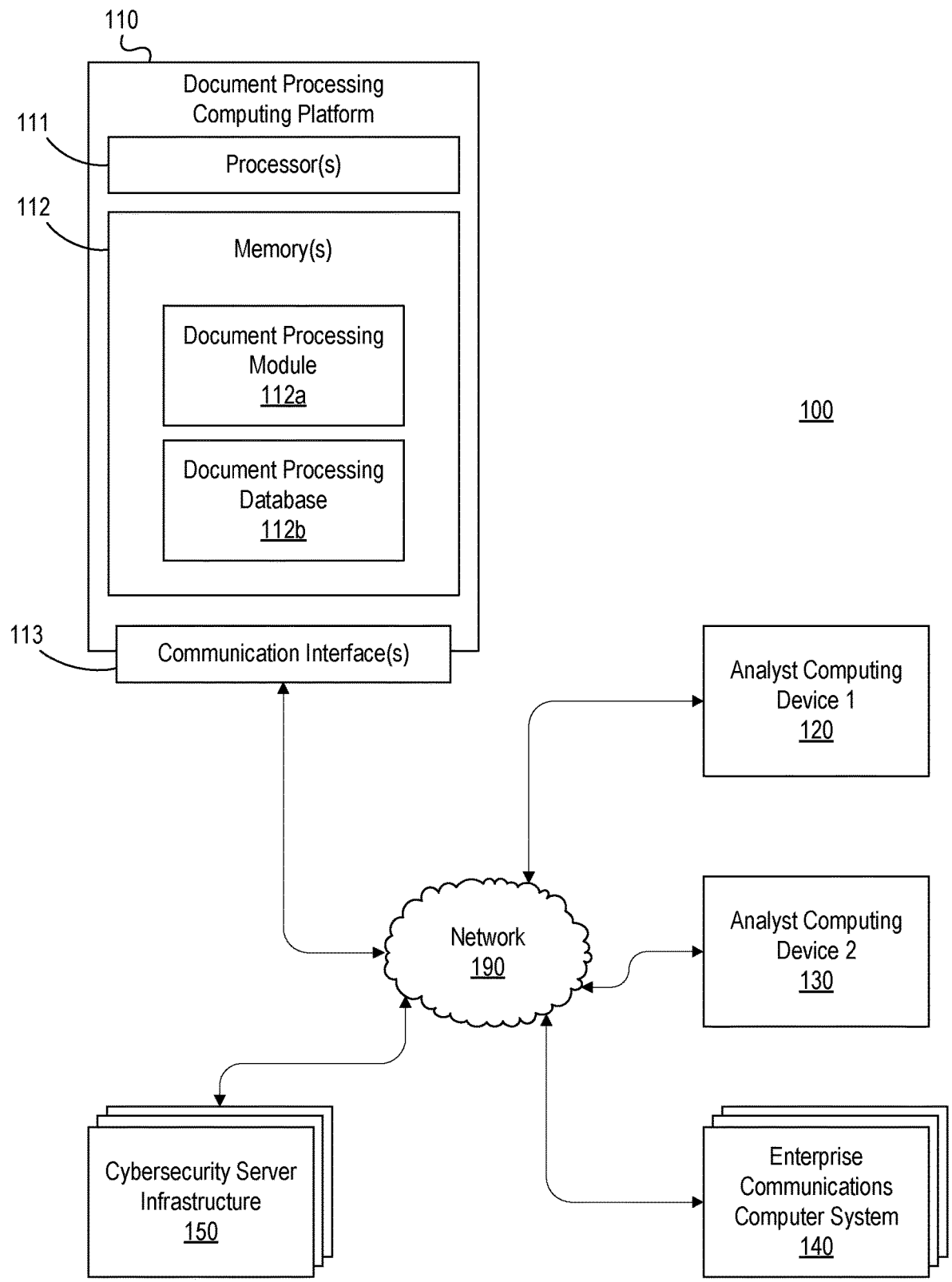
FIG. 1 depicts an illustrative operating environment for using a machine learning system to process a corpus of documents associated with a user to determine a user-specific consequence index in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to threat scoring, such as threat scoring that is performed in a people-centric manner. For example, threat scores associated with attacks targeting a particular user in an organization may be used to compute an attack index for that person, representing a composite for all threats targeting that individual. In some instances, the attack index may be used in conjunction with other attributes, such as a privilege index and/or vulnerability index, and may be used to determine a risk-index on an individual by individual basis (e.g., a people risk-index). Once risk-index values have been established, relativistic risk profiles may be evaluated for various hierarchal levels of an organization, or based on different network domains, etc. By way of example, risk profiling may be performed on the basis of geography, business unit, network domain, and/or organization type, etc.

By providing the ability to evaluate individual risk based on a people-centric attack index, aspects of the disclosure may provide valuable insights as to what inbound threats should be selected for further response, for example, by an organization's security provider or network security team. Such insights may be used to manage organizational exposure by providing targeted insights on what network users, user groups, domains, or business units could benefit from enhanced training and/or security infrastructure.

As used herein, a "threat score" can relate to a numerical score for a specific threat detected by a cyber-security system. A threat score may be based on data identifying the type of threat (e.g. threat type) and actor. As used herein, threat type can relate to any categorical identifier that is (or may be) used to describe a particular mode of cyber-attack. By way of example, various threat types can include, but are not limited to, one or more of the following categories: APT Malware State, APT Malware Financial, Backdoor, Sysadmin Tools, Pen-Test, RAT, Keylogger, Point-of-Sale, Stealer, Malware Unknown, Downloader, Credential Phish Unknown, Credential Phish Corporate, Ransomware, Credential Phish Consumer, Banker, Spambots, Cryptocurrency Miners, Ad-Fraud, MalSpam, and the like.

As discussed in further detail below, different types of functions may be used to calculate an aggregate threat score, e.g., on a per-user basis. For example, threat scores may be derived from sum totals of threats for each of a number of users. In other implementations, threat scores may be calculated using an exponential loss function to aggregate the threat scores on a per-user basis. Various threat score calculations may be used, depending on the desired implementation.

Additionally, as used herein "actor" can refer to any information that indicates, or that may be used to infer, an identity of an individual, group or organization (e.g., crime syndicate or nation state, etc.) responsible for launching a cyber-attack or attack campaign. In some instances, information known about the threat type may be used to infer actor information, and vice versa.

Threat scoring may be further based on quantitative or qualitative measures of "targetedness." As used herein, targetedness can refer to a measure of attack specificity, and may be based on the breadth (or narrowness) of an attack or attack campaign within a specific context. By way of example, an attack may be highly targeted (of "high targetedness") if it is directed at a single individual, or group of similar individuals, such as, all engineering directors, or all Human Resources (HR) heads, etc., within an organization. Additionally, an attack may have greater targetedness if directed at organizations or networks associated with a specific market vertical, e.g., specifically targeting data security companies, specific political affiliates, or healthcare providers, etc. As such, the degree of targetedness assigned to an attack can depend on the scope and context in which the attack occurs.

In some approaches, targetedness can also be based on geographic specificity. For example, if an attack is propagated across diverse geographic areas, it may be deemed to have a lower targetedness than if the attack was directed at specific geographic (or socio-political) areas. By way of example, if an attack is targeted at unrelated businesses across North America, then the attack may be given a relatively low targetedness score. Alternatively, if the attack is limited to technology companies in San Jose and Boston, the attack may be deemed to have greater targetedness, reflecting a greater contextual specificity.

The threat scoring model provides a numerical score that acts as a severity index for a specific threat. In some implementations, scores are fixed on a scale from 1-1000; however, it is understood that other scaling ranges may be implemented, without departing from the scope of the technology. In some implementations, an initial range may be calculated based on threat and actor type, and the final score within the initial range may be determined based on the determined amount of targetedness (concentration) of the threat. For example, if the threat is widespread (less targeted), then the final threat score may be at the lower end of the initial range. However, if the threat is highly-targeted (high targetedness), then the final threat score may be at the upper boundary of the initial range.

As an example, a range of possible scores determined from the threat+actor combination may be: Ransomware+Russian Crime Organization=(20 min, 100 max)—that is, the range would be 20-100. If targetedness is determined to be low (i.e., multiple unrelated users received the same attack attempt), the final threat score may be closer to 20 than 100. Alternatively, if targetedness is determined to be high (i.e., a small group of highly similar users received the attack at the exclusion of all others), then the final threat score may be closer to 100 than 20.

As used herein, "privilege index" or "privilege score" can refer to a numerical score (e.g., a composite score) representing a degree or amount of privileged associated with a particular network user. By way of example, a privileged index may be based on one or more of: a degree of elevation of login credentials, a degree of access to specific data or system resources, access to intellectual property, access to employee or customer data, an ability to wire-transfer funds, and/or access to insider information, etc. In some instances, a "user-specific consequence index" (which, e.g., is discussed in greater detail below) for a particular user may be the same as, may correspond to, and/or may be determined based in part on the particular user's privilege index.

As used herein, "vulnerability index" or "vulnerability score" can refer to a numerical score (e.g., a composite score) representing a user vulnerability to various threat vectors. A vulnerability index may be determined based on a user's systems and job role, as well as user behaviors including previous actions that can increase (or decrease) the user's likelihood of falling victim to an attack. By way of example, the vulnerability index may be based a degree of vulnerability due to a job role that requires frequent user interaction with threat vectors, e.g., URLs, email attachments, and/or phishing messages. The vulnerability index can also be based on a user's implementation (or lack thereof) of enhanced security controls, such as when it is detected that the user is utilizing multi-factor authentication, or cloud sandboxing for email attachments, etc. Additionally, the vulnerability index may be based on user vulnerabilities due to use of older or vulnerable software, operating systems, or devices, and/or vulnerability measures based on user behaviors, such as performance on security audits and/or security training tests, etc.

In some implementations, the computed attack-index, privilege index, and vulnerability-index, may be used to determine overall risk-index for each individual (user) within an organization. That is, risk-index scoring may be performed on a user-by-user basis. In one approach, the risk-index may be computed from a sum of individual scores calculated for each of the attack-index, privileged index and vulnerability-index. However, other risk-index score calculations may be used, without departing from the scope of the technology. For example, risk-index scores may be based on an exponential loss function to aggregate the threat scores on a per-user basis, rather than using a simple sum of scores. However, other scoring methodologies are contemplated without departing from the scope of the disclosed technology.

Some aspects of the disclosure relate to determining a "user-specific consequence index" for a particular user. As noted above, this consequence index may be the same as or related to a user's privilege index and thus may affect a determination of an overall risk-index for the user.

In many instances, it may be difficult to determine a given user's consequence index. This problem may, among other things, result from the fact that given a collection of information associated with the user (e.g., a corpus of documents, email messages, email attachments, and/or the like), it may be difficult (1) to determine whether the collection includes items of relevance, and (2) to efficiently and effectively categorize the items in the collection to facilitate further processing and/or analysis.

Some aspects of the disclosure address these and other issues by applying, in combination, unsupervised machine learning algorithms and supervised machine learning algorithms, thus enabling a computing platform to efficiently and effectively process a collection of information associated with a user and determine a user-specific consequence index for the user. For example, the computing platform may apply one or more unsupervised machine learning algorithms (e.g., clustering algorithms that group based on similar features, topic analysis algorithms that group based on similar topics being discussed in a set of items, keyword search algorithms that group based on the presence of common keywords, common entity algorithms that group based on common entities being addressed, common phrase algorithms that group based on common phrases being present, etc.) to review all of the items in the user-specific collection, identify items that appear similar, and group such items together into one or more clusters (e.g., such that items within a cluster are similar and items in different clusters are different).

In addition, the computing platform may apply one or more supervised machine learning algorithms in which a reviewing user is prompted to label groups of items in the collection at once, rather than being prompted to label individual items one at a time. By prompting the user to label groups of items rather than individual items, the computing platform may quickly, easily, and effectively train a classifier algorithm on the labels received from the reviewing user, and subsequently may create new groups of items from the collection using the classifier algorithm as the review process is iteratively performed (which in turn, e.g., may be reviewed and labeled). The groups created using the supervised learning algorithm(s) may overlap with the groups created using the unsupervised learning algorithm(s). In some instances, any and/or all of these machine-created groups may be referred to as "smart groups" in this disclosure. In addition, and as illustrated in detail below, by tracking how a reviewing user interacts with different smart groups in the process of reviewing the collection, the computing platform may prioritize specific grouping methods over others when organizing a collection of user items for purposes of determining a user-specific consequence index.

FIG. 1 depicts an illustrative operating environment for using a machine learning system to process a corpus of documents associated with a user to determine a user-specific consequence index in accordance with one or more example embodiments. Referring to FIG. 1, computing environment 100 may include various computer systems, computing devices, networks, and/or other operating infrastructure. For example, computing environment 100 may include document processing computing platform 110, analyst computing device 120, analyst computing device 130, enterprise communications computer system 140, cybersecurity server infrastructure 150, and network 190. Network 190 may include one or more wired networks and/or one or more wireless networks that interconnect document processing computing platform 110, analyst computing device 120, analyst computing device 130, enterprise communications computer system 140, cybersecurity server infrastructure 150, and/or other computer systems and/or devices. In addition, each of document processing computing platform 110, analyst computing device 120, analyst computing device 130, enterprise communications computer system 140, and cybersecurity server infrastructure 150 may be special purpose computing devices configured to perform specific functions, as illustrated in greater detail below, and may include specific computing components such as processors, memories, communication interfaces, and/or the like.

Document processing computing platform 110 may include one or more processor(s) 111, one or more memory(s) 112, and one or more communication interface(s) 113. In some instances, document processing computing platform 110 may be made up of a plurality of different computing devices, which may be distributed within a single data center or a plurality of different data centers. In these instances, the one or more processor(s) 111, one or more memory(s) 112, and one or more communication interface(s) 113 included in document processing computing platform 110 may be part of and/or otherwise associated with the different computing devices that form document processing computing platform 110.

In one or more arrangements, processor(s) 111 may control operations of document processing computing platform 110. Memory(s) 112 may store instructions that, when executed by processor(s) 111, cause document processing computing platform 110 to perform one or more functions, as discussed below. Communication interface(s) 113 may include one or more wired and/or wireless network interfaces, and communication interface(s) 113 may connect document processing computing platform 110 to one or more networks (e.g., network 190) and/or enable document processing computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause document processing computing platform 110 to perform various functions) and/or databases (which may, e.g., store data used by document processing computing platform 110 in performing various functions). For example, memory(s) 112 may store and/or otherwise provide a document processing module 112a and a document processing database 112b. In some instances, document processing module 112a may store instructions that cause document processing computing platform 110 to execute one or more of the functions described herein. Additionally, document processing database 112b may store data that is used by document processing computing platform 110 in executing one or more of the functions described herein.

Analyst computing device 120 may be configured to be used by a first user (who may, e.g., be an analyst associated with an enterprise organization). In some instances, analyst computing device 120 may be configured to receive and present user interfaces generated by document processing computing platform 110, send user input received at analyst computing device 120 to document processing computing platform 110, and/or otherwise exchange data with document processing computing platform 110. Analyst computing device 130 may be configured to be used by a second user (who may, e.g., be an analyst associated with an enterprise organization) different from the first user. Like analyst computing device 120, analyst computing device 130 may be configured to receive and present user interfaces generated by document processing computing platform 110, send user input received at analyst computing device 120 to document processing computing platform 110, and/or otherwise exchange data with document processing computing platform 110.

Enterprise communications computer system 140 may be configured to receive, store, and/or transmit electronic communications associated with an enterprise organization. For instance, enterprise communications computer system 140 may be configured to receive, store, and/or transmit email messages associated with an enterprise organization. In some instances, enterprise communications computer system 140 may provide such communications to document processing computing platform 110 (e.g., for analysis by document processing computing platform 110 and/or one or more users of analyst computing device 120 and/or analyst computing device 130).

Cybersecurity server infrastructure 150 may be configured to receive one or more user-specific consequence indices and/or other data from document processing computing platform 110 (e.g., as illustrated in greater detail below). In addition, cybersecurity server infrastructure 150 may be configured to provide various cybersecurity functions on its own and/or in combination with other systems and/or devices in computing environment 100 to one or more computing devices and/or users associated with an enterprise organization (e.g., the enterprise organization associated with document processing computing platform 110). For example, cybersecurity server infrastructure 150 may execute and/or otherwise provide enterprise-wide email filtering, phishing protection services, data loss protection services, malware protection services, cybersecurity training functions, and/or other enterprise-level cybersecurity features.

Figure 2:
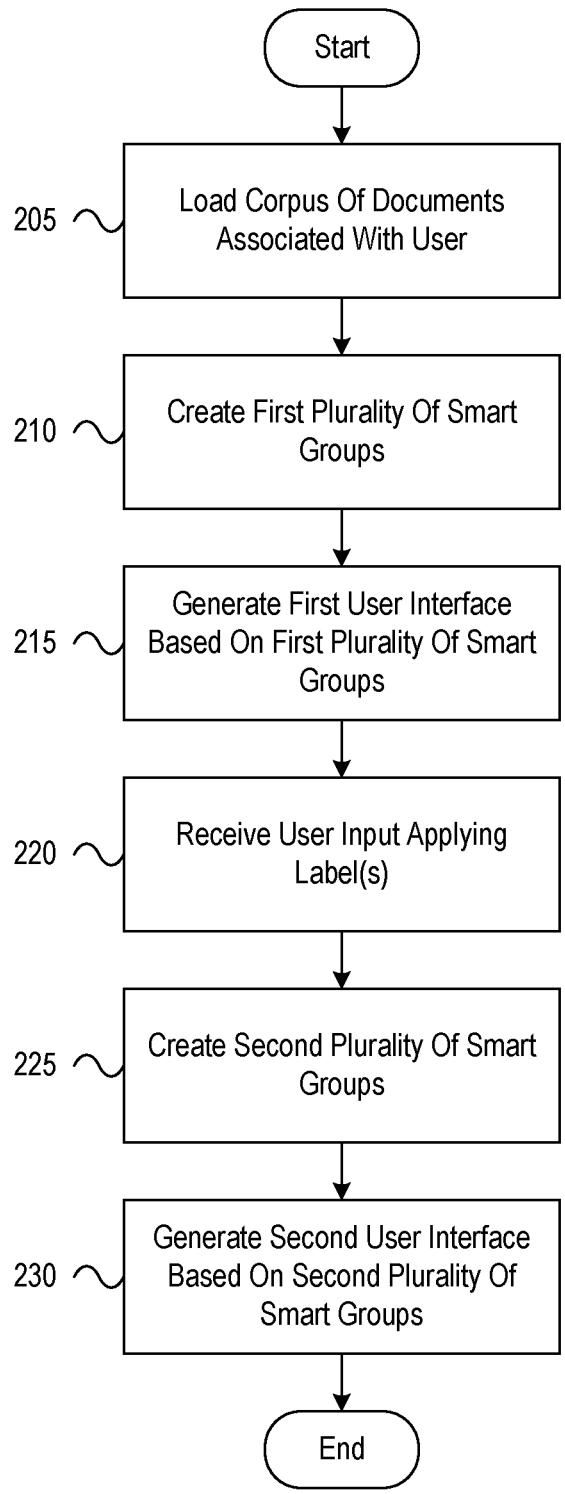
FIG. 2 depicts an illustrative method for using a machine learning system to process a corpus of documents associated with a user to determine a user-specific consequence index in accordance with one or more example embodiments.

FIG. 2 depicts an illustrative method for using a machine learning system to process a corpus of documents associated with a user to determine a user-specific consequence index in accordance with one or more example embodiments. In one or more arrangements, the method illustrated in FIG. 2 may be executed by document processing computing platform 110. For example, referring to FIG. 2, at step 205, document processing computing platform 110 may load a corpus of documents associated with a user.

In some embodiments, loading the corpus of documents associated with the user may include receiving a plurality of email messages associated with the user from an enterprise communications computer system. For example, in loading the corpus of documents associated with the user may at step 205, document processing computing platform 110 may receive a plurality of email messages associated with the user from an enterprise communications computer system (e.g., enterprise communications computer system 140). For instance, document processing computing platform 110 may receive email messages, attachments, and/or other content that is extracted from and/or otherwise associated with a specific user's email account. As illustrated below, document processing computing platform 110 may use any and/or all of this information in evaluating how much sensitive information the user has access to, which may be used in determining a consequence index and/or privilege index for the user. In some instances, document processing computing platform 110 may use any and/or all of this information for other purposes, such as enabling a user of analyst computing device 120 and/or analyst computing device 130 to investigate the user's communications for potential policy violations and/or other issues.

At step 210, document processing computing platform 110 may create a first plurality of smart groups based on the corpus of documents associated with the user. For example, document processing computing platform 110 may create overlapping groups of documents having one or more common features, while using different criteria for different groups, and these groups may form the smart groups, as illustrated in greater detail below. As used herein, a "smart group" may refer to a set of documents that is selected (e.g., by document processing computing platform 110) from the corpus of documents associated with the user based on each document in the set of documents meeting one or more common criteria. Such common criteria may, for instance, include one or more keywords, file size, file type, and/or other criteria. By grouping based on multiple criteria, different aspects of a corpus of documents may be utilized by document processing computing platform 110 to discover latent correlations in the corpus of documents (and such latent correlations might only be brought out by leveraging multiple aspects of the corpus of documents in creating the smart groups, e.g., rather than using only a single aspect). In some instances, document processing computing platform 110 may create the first plurality of smart groups by executing one or more clustering algorithms that create overlapping groups of documents by clustering and/or otherwise grouping based on the following data type features (which may, e.g., be extracted from the documents by document processing computing platform 110):

| Data Type | Document Data | Source Data |
| --- | --- | --- |
| Text | The text associated with each document (optionally with some character and/or token limit) | Original and extracted text |
| Subject | The subject of the email message associated with each document (if applicable) | Email subject lines |
| Title | A form of summarization for each document considering heading information if available or else initial text | Rudimentary summarization |
| FileType | The file type of each document | Document extensions |
| EntityType | Entity types present within each document | Entity extraction |
| EntityText | Entity text strings present within each document | Entity extraction |
| Clustered | Cluster IDs from various (multiple algorithm/parameter combinations) clustering runs associated with each document | Clustering results |
| Tags | Tags associated with each document | Manual, semi-automatic, or automatic document tagging |
| VData | Supervision violation data associated with each document | Supervision output |
| KeywordSearch | Retrieval of documents sharing a specific keyword | DB or Elasticsearch |
| RegexSearch | Retrieval of documents matching a regular expression pattern | DB or Elasticsearch |
| RetrievalQuery | Retrieval of documents matching a retrieval | DB or Elasticsearch |
| N-Word-Gram | Retrieval of documents sharing a common N-Word-Gram | Tokenization and indexing |
| VectorSimilarity | Retrieval of documents close to each other or some seed document(s) in vector space | Vectorization |
| ClassificationMatch | Retrieval of documents matching some seed document(s) given some training labels within the corpus | Vectorization and modeling |

In some embodiments, creating the first plurality of smart groups based on the corpus of documents associated with the user may include executing multiple unsupervised machine-learning algorithms to produce the first plurality of smart groups. For example, in creating the first plurality of smart groups based on the corpus of documents associated with the user at step 210, document processing computing platform 110 may execute multiple unsupervised machine-learning algorithms to produce the first plurality of smart groups. For instance, document processing computing platform 110 may use different unsupervised machine-learning algorithms to form each group of the first plurality of smart groups (e.g., a first algorithm may yield a first group, a second algorithm may yield a second group, etc.). In some instances, the groups produced by the different unsupervised machine-learning algorithms may be overlapping (e.g., the same document or item may be included in multiple groups). For instance, a first document may be included in a first group by document processing computing platform 110 based on the first document being clustered with other items in the first group based on its entity type, and the first document may be included in a second group by document processing computing platform 110 based on the first document being clustered with other, different items in the second group based on a keyword search. This overlapping approach to creating different groups may provide various advantages over conventional approaches. For instance, as an analyst user reviews and/or interacts with different groups in a particular order, document processing computing platform 110 may learn which groups and/or features provide the most relevant and/or useful results to the analyst user. Document processing computing platform 110 then may prioritize grouping algorithms that create groups based on those features, as discussed in greater detail below. Such prioritization may create a more efficient and effective user experience, and also may provide additional technical advantages such as ensuring efficient use of computing resources by document processing computing platform 110 in creating such groups and performing other functions.

In some instances, executing the multiple unsupervised machine-learning algorithms to produce the first plurality of smart groups may include executing one or more clustering algorithms. For example, in executing the multiple unsupervised machine-learning algorithms to produce the first plurality of smart groups, document processing computing platform 110 may execute one or more clustering algorithms. For instance, document processing computing platform 110 may use different clustering algorithms to form different groups of the first plurality of smart groups (e.g., a first clustering algorithm may yield a first group by creating clusters using a first common feature set, a second clustering algorithm may yield a second group by creating clusters using a second common feature set, etc.). In some instances, the clustering algorithms executed by document processing computing platform 110 may, for instance, create clusters based on one or more of the data type features shown in the table above (e.g., combinations of different data type features may form different feature sets of the clustering algorithms). As illustrated in greater detail below, each smart group created by document processing computing platform 110 may share a different common feature.

At step 215, document processing computing platform 110 may generate a first user interface comprising a representation of the first plurality of smart groups. For example, document processing computing platform 110 may generate a user interface similar to the example user interface illustrated in FIG. 4, as described in greater detail below. In some instances, document processing computing platform 110 may send the first user interface to analyst computing device 120 and/or analyst computing device 130, which may cause analyst computing device 120 and/or analyst computing device 130 to present the first user interface. The first user interface may include a graphical representation of the first plurality of smart groups created by document processing computing platform 110 and may allow an analyst user (e.g., of analyst computing device 120 and/or analyst computing device 130) to label and/or otherwise interact with one or more of the smart groups.

At step 220, document processing computing platform 110 may receive user input applying one or more labels to one or more documents associated with one or more smart groups of the first plurality of smart groups. For example, at step 220, document processing computing platform 110 may receive user input (e.g., from analyst computing device 120 and/or analyst computing device 130) applying one or more labels to a plurality of documents associated with at least one smart group of the first plurality of smart groups. Such user input may, for instance, interact with the first user interface and/or operate to apply one or more labels to the one or more documents. In receiving such user input, document processing computing platform 110 may cause analyst computing device 120 and/or analyst computing device 130 to present user interfaces similar to the example user interfaces illustrated in FIGS. 5 and 6, as described in greater detail below. In addition, and as seen in these example user interfaces, by allowing an analyst user (e.g., of analyst computing device 120 and/or analyst computing device 130) to define one or more new categories and then bulk label items as belonging to such categories, document processing computing platform 110 may provide the analyst user with an efficient process for creating a labeled data set from which document processing computing platform 110 can generate and/or train new and/or updated classification models (which may, e.g., enable document processing computing platform 110 to generate more useful and/or better formed smart groups in the future). For instance, on a future iteration, after an analyst label creates a new category and/or applies a label to a group of documents, document processing computing platform 110 may update the list of remaining uncategorized documents and may present an updated view that includes a group formed (e.g., by document processing computing platform 110) using a classification model that utilizes the last set of labels applied to the other documents so as to learn what else in the remaining, uncategorized corpus might be of the same type. In this way, document processing computing platform 110 may implement a combination of both supervised learning and unsupervised learning to efficiently and effectively categorize the corpus of documents.

At step 225, document processing computing platform 110 may create a second plurality of smart groups based on the corpus of documents associated with the user and the user input applying the one or more labels to the plurality of documents associated with the at least one smart group of the first plurality of smart groups. For example, based on the user input applying the one or more labels to the plurality of documents associated with the at least one smart group of the first plurality of smart groups, document processing computing platform 110 may recalculate the smart groups that were previously displayed in the first user interface, to produce an updated set of smart groups (e.g., the second plurality of smart groups). For instance, document processing computing platform 110 may determine, based on the user input received at step 220 and/or re-execution of the machine-learning algorithms described above in view of such user input, that certain documents that were part of a first group should no longer be part of the first group, that certain documents that were not part of a second group should be part of the second group, and so on.

By creating the second plurality of smart groups in this way (e.g., at step 225), document processing computing platform 110 may iteratively learn new categories or features that are relevant for grouping from the user (e.g., by receiving user input in the supervised learning phase) and then may apply clustering algorithms and/or other unsupervised learning algorithms to find new groups (e.g., possibly based on the user-defined categories or features). Thus, document processing computing platform 110 may generate potentially overlapping groups (e.g., analysis results) at every iteration from both one or more supervised learning models and one or more unsupervised learning models, while integrating an active learning component (e.g., the supervised classifier may be providing samples that it thinks an analyst user should manually label). In addition, document processing computing platform 110 may apply different clustering algorithms all at once (e.g., at each iteration), rather than applying such algorithms sequentially. This all-at-once approach may produce overlapping groups (which may, e.g., enable the prioritization functions discussed below) and thus may provide advantages over conventional approaches in which unsupervised clustering algorithms tend to produce non-overlapping groups.

In some embodiments, creating the second plurality of smart groups based on the corpus of documents associated with the user and the user input applying the one or more labels to the plurality of documents associated with the at least one smart group of the first plurality of smart groups may include creating one or more smart groups of the second plurality of smart groups using a supervised machine learning mechanism. For example, in creating the second plurality of smart groups based on the corpus of documents associated with the user and the user input applying the one or more labels to the plurality of documents associated with the at least one smart group of the first plurality of smart groups at step 225, document processing computing platform 110 may create one or more smart groups of the second plurality of smart groups using a supervised machine learning mechanism. For instance, document processing computing platform 110 may execute a supervised machine learning mechanism that utilizes the user input applying the one or more labels to the one or more documents associated with the one or more smart groups of the first plurality of smart groups to produce the second plurality of smart groups based on the corpus of documents associated with the user. In this way, document processing computing platform 110 may, in some instances, update and/or retrain one or more classification models that are being used by document processing computing platform 110 to form some of the smart groups (e.g., based on the label(s) applied by the user to certain items and/or groups) while also continuing to create and/or present other groups using one or more clustering algorithms and/or other unsupervised learning algorithms.

At step 230, document processing computing platform 110 may generate a second user interface comprising a representation of the second plurality of smart groups. For example, document processing computing platform 110 may generate a user interface similar to the example user interface illustrated in FIG. 7, as described in greater detail below. In some instances, document processing computing platform 110 may send the second user interface to analyst computing device 120 and/or analyst computing device 130, which may cause analyst computing device 120 and/or analyst computing device 130 to present the second user interface. Subsequently, document processing computing platform 110 may iteratively continue to create and/or update smart groups of documents, for instance, as additional user input is received (e.g., labeling and/or otherwise interacting with smart groups in the second plurality of smart groups) via one or more user interfaces generated by document processing computing platform 110.

In some embodiments, document processing computing platform 110 may receive user input applying a sensitivity value to one or more documents included in the corpus of documents associated with the user. For example, document processing computing platform 110 may receive such user input from analyst computing device 120 and/or analyst computing device 130 via a user interface similar to the example user interface illustrated in FIG. 30, as described in greater detail below. Subsequently, document processing computing platform 110 may calculate a person-centric consequence index for the user based on the user input applying the sensitivity value to the one or more documents included in the corpus of documents associated with the user. For instance, document processing computing platform 110 may calculate a person-centric consequence index for the user based on an analyst-assigned sensitivity value and/or based on unsupervised evaluation of the user's documents by document processing computing platform 110 (e.g., in view of sensitivity values assigned to other, similar documents associated with other users).

In some instances, document processing computing platform 110 may output the person-centric consequence index calculated for the user to an enterprise risk classification system. For instance, the person-centric consequence index calculated for the user by document processing computing platform 110 may represent the user's privilege index and may be combined with an attack index and/or a vulnerability index to calculate an overall risk index for the user, as described above. In some instances, the calculation of such an overall risk index for the user may be performed by the enterprise risk classification system (e.g., cybersecurity server infrastructure 150) after receiving the person-centric consequence index calculated for the user from document processing computing platform 110. In other instances, document processing computing platform 110 itself may calculate such an overall risk index for the user (e.g., based on receiving an attack index and/or a vulnerability index for the user from the enterprise risk classification system, e.g., cybersecurity server infrastructure 150). In outputting the person-centric consequence index calculated for the user to the enterprise risk classification system (e.g., cybersecurity server infrastructure 150), document processing computing platform 110 may send, share, and/or otherwise transmit the person-centric consequence index calculated for the user to the enterprise risk classification system (e.g., cybersecurity server infrastructure 150).

In some embodiments, document processing computing platform 110 may monitor user interactions involving the one or more smart groups of the first plurality of smart groups and one or more smart groups of the second plurality of smart groups. For instance, in monitoring such user interactions, document processing computing platform 110 may generate and/or store records indicative of an analyst user (e.g., of analyst computing device 120 and/or analyst computing device 130) interacting with specific smart groups at specific times and/or in a specific order. Subsequently, document processing computing platform 110 may assign at least one priority value to a first set of smart groups of the one or more smart groups of the first plurality of smart groups and the one or more smart groups of the second plurality of smart groups based on the monitored user interactions. For instance, based on the records indicative of the analyst user interacting with the specific smart groups at the specific times and/or in the specific order, document processing computing platform 110 may identify and/or determine that certain smart groups are more relevant and/or important to the analyst user (e.g., based on the analyst user interacting with certain groups relatively more than other groups). Document processing computing platform 110 may assign priority values to the groups accordingly, such that prioritized groups may be surfaced and/or displayed relatively more prominently in one or more user interfaces generated by document processing computing platform 110 relative to non-prioritized groups. For example, document processing computing platform 110 may prioritize a specific group by incrementing a weight value for the group (e.g., each time the user interacts with that group) and/or by decrementing weight values for other groups (e.g., at the same time as incrementing the weight value for the group that the user did interact with). In this way, records of how an analyst user interacts with the smart groups may provide document processing computing platform 110 with training data that can be used by document processing computing platform 110 in prioritizing the generation and/or presentation of smart groups.

In some embodiments, document processing computing platform 110 may output data associated with the second plurality of smart groups to an e-discovery platform application. For instance, document processing computing platform 110 may output data associated with an automated and/or manual analysis of one or more documents associated with the second plurality of smart groups to an e-discovery platform application. Such output may, for instance, identify documents selected by document processing computing platform 110 and/or by an analyst user of analyst computing device 120 and/or analyst computing device 130 from the corpus of documents that are relevant to an e-discovery operation.

In some embodiments, document processing computing platform 110 may output data associated with the second plurality of smart groups to a compliance supervision application. For instance, document processing computing platform 110 may output data associated with an automated and/or manual analysis of one or more documents associated with the second plurality of smart groups to a compliance supervision application. Such output may, for instance, identify documents selected by document processing computing platform 110 and/or by an analyst user of analyst computing device 120 and/or analyst computing device 130 from the corpus of documents that are relevant to one or more potential compliance violations.

In some embodiments, document processing computing platform 110 may output data associated with the second plurality of smart groups to a malicious object or event labeling application. For instance, document processing computing platform 110 may output data associated with an automated and/or manual analysis of one or more documents associated with the second plurality of smart groups to a malicious object or event labeling application. Such output may, for instance, identify documents selected by document processing computing platform 110 and/or by an analyst user of analyst computing device 120 and/or analyst computing device 130 from the corpus of documents that are potentially malicious objects or events (e.g., malicious computer files, malicious websites, malicious application login events, and/or other malicious objects and/or events).

Figure 3:
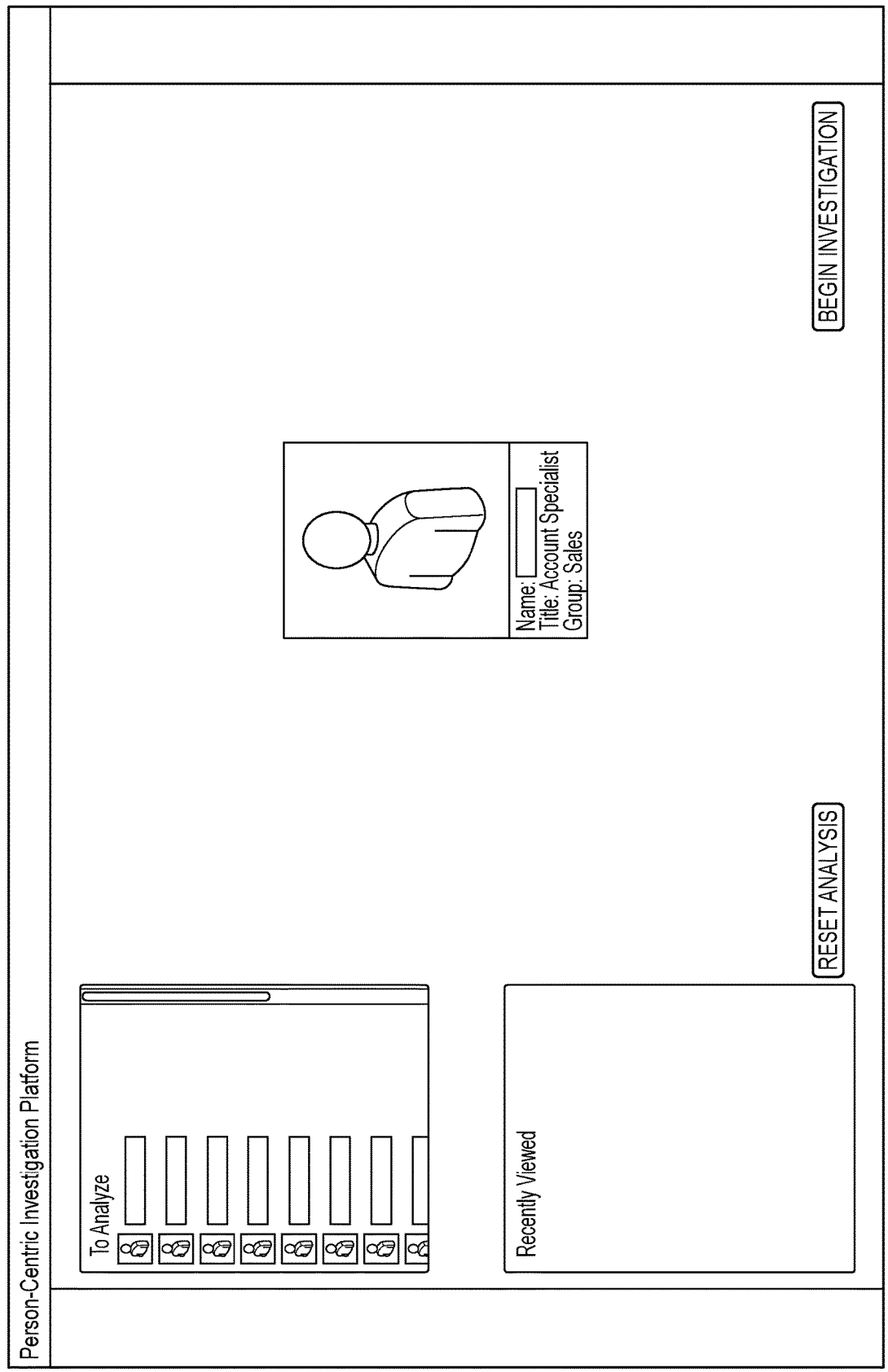

FIGS. 3-30 depict illustrative user interfaces for using a machine learning system to process a corpus of documents associated with a user to determine a user-specific consequence index in accordance with one or more example embodiments. For example, FIG. 3 illustrates an initial user interface that may be generated by document processing computing platform 110 (which may, e.g., enable a user of analyst computing device 120 and/or analyst computing device 130 to select a user for whom a corpus of documents should be loaded). FIG. 4 illustrates an interface that includes initial set of smart groups generated by document processing computing platform 110 based on the corpus of documents. As seen in FIG. 4, each smart group may be represented by a card. Each card may include a label indicating a smart group type (which may, e.g., indicate the underlying technology used to create the group, such as unsupervised machine learning, low-shot machine learning, active learning, information retrieval techniques, pre-defined regular expressions, user-defined regular expressions, etc.). Each card also may include an identification of the number of documents in the smart group, a cohesion score (which may, e.g., be a value from 0-100 that represents the similarity of the documents in the smart group), and a summary of the key attributes that caused the documents to be grouped together.

FIG. 5 illustrates an interface that includes a view of documents associated with a particular smart group, and FIG. 6 illustrates an interface in which an "ignore" label is being created and applied to several of the documents from the smart group that have been selected by a user.

FIG. 7 illustrates an interface that includes an updated set of smart groups generated by document processing computing platform 110 based on the user input applying the "ignore" label to several documents. As seen in FIG. 7, the updated set of smart groups is different from the set of smart groups shown in FIG. 4, both in terms of the smart groups that exist and in terms of the documents that are associated with specific groups. In addition, the "ignore" label coexists with the "to-do" label in the lower area of the user interface generated by document processing computing platform 110 where different labels may be summarized.

Figure 9:
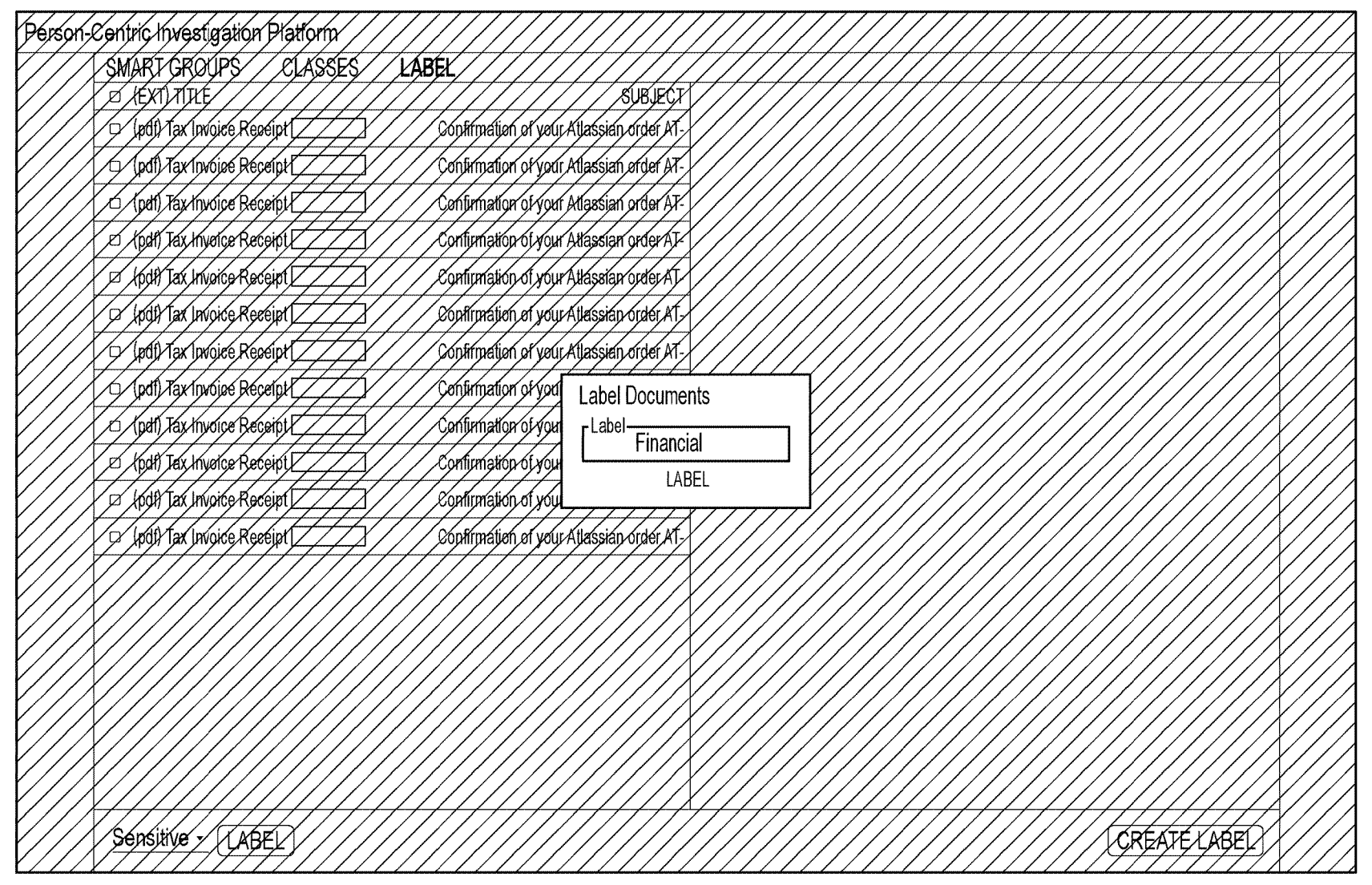

FIG. 8 illustrates an interface that includes a view of documents associated with one of the updated smart groups, and FIG. 9 illustrates an interface in which a "financial" label is being created and applied to several of the documents from the smart group that has been selected by a user. FIG. 10 illustrates an interface that includes another updated set of smart groups generated by document processing computing platform 110 based on the user input applying the "financial" label to several documents. As seen in FIG. 10, a reduced set of smart groups is presented in the interface because fewer documents are still associated with the "to-do" label at this point in the example sequence.

Figure 12:
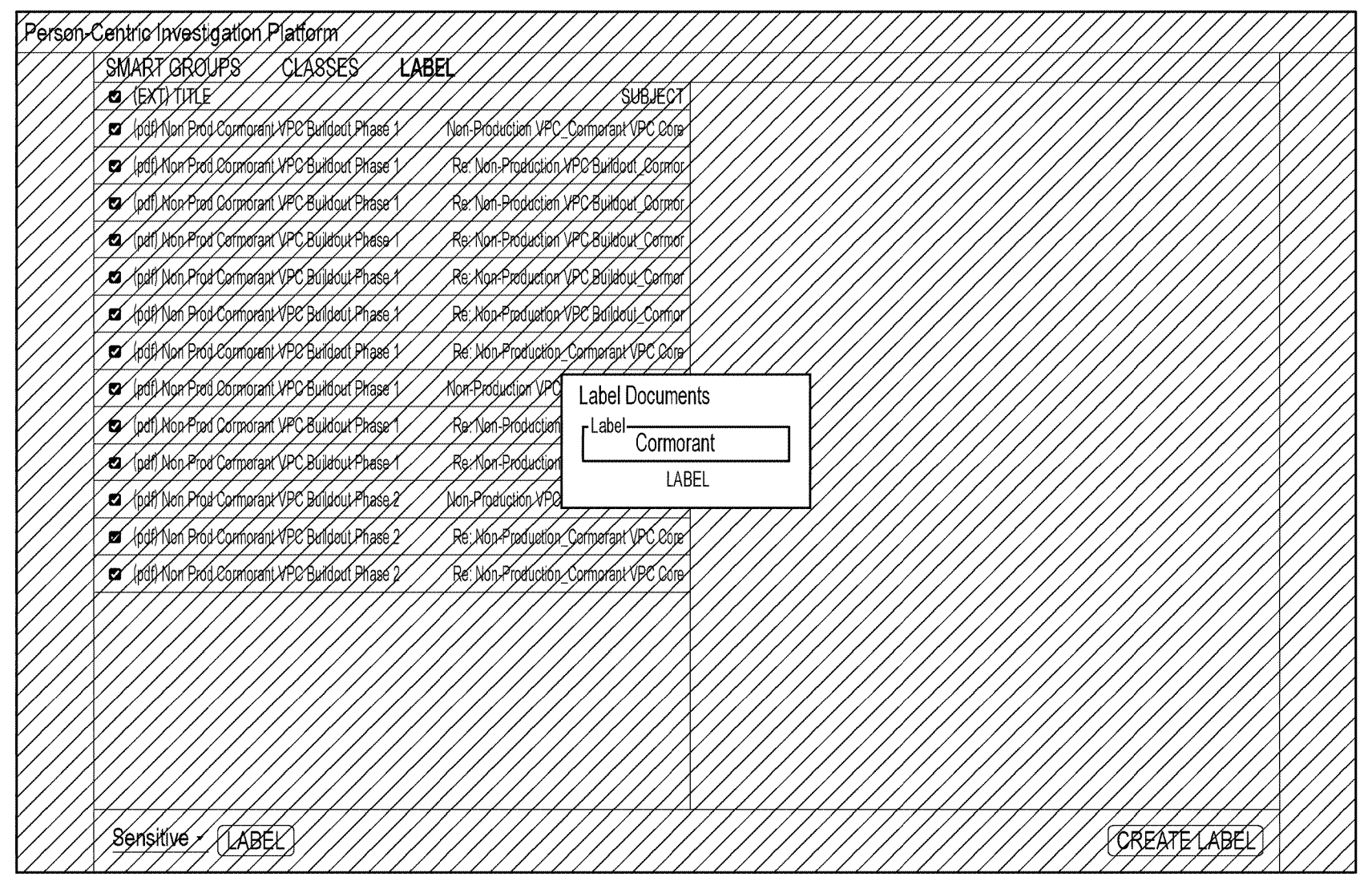
Figure 13:
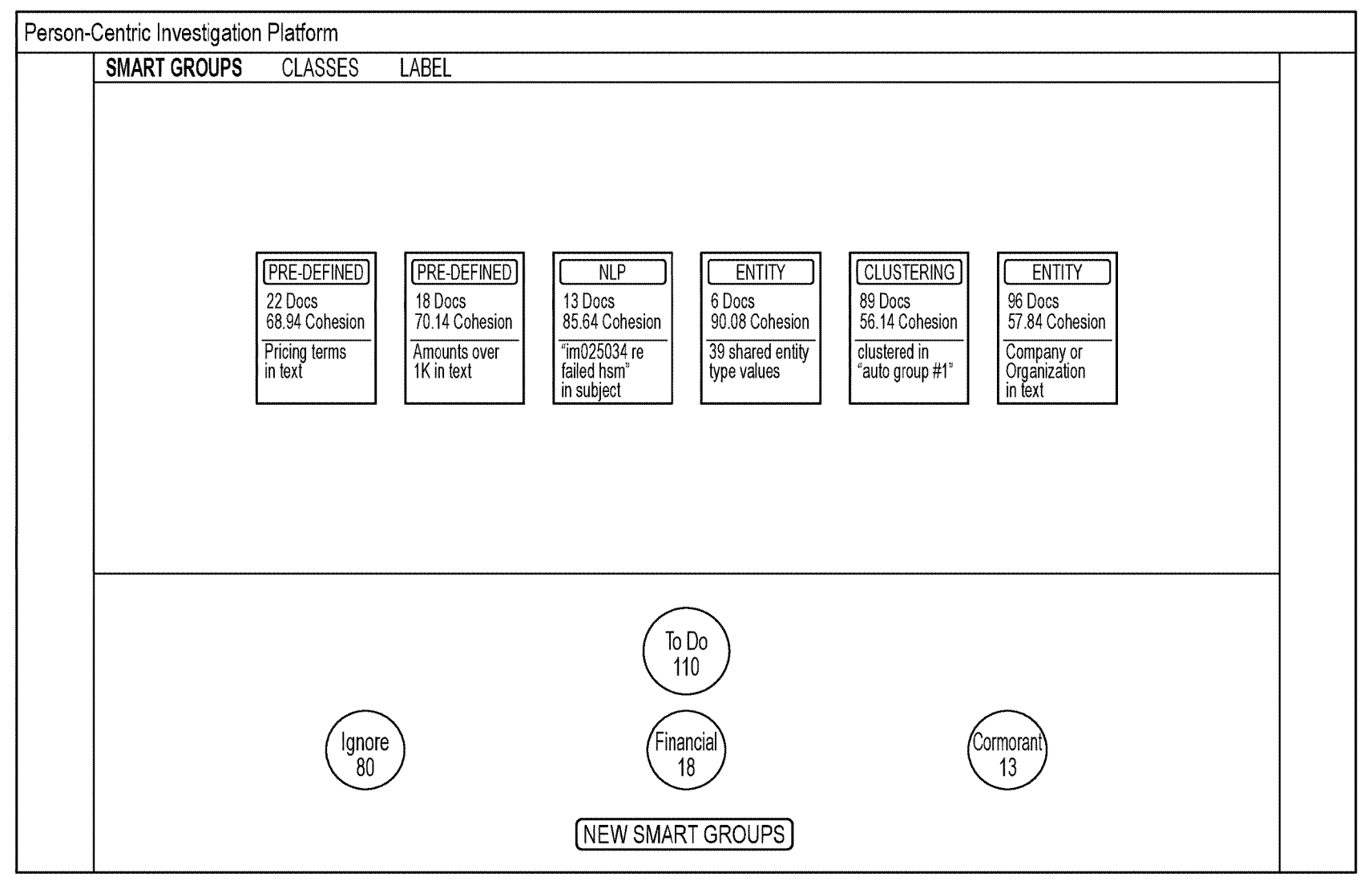

FIG. 11 illustrates an interface that includes a view of documents associated with one of the updated smart groups, and FIG. 12 illustrates an interface in which a "cormorant" label is being created and applied to several of the documents from the smart group that has been selected by a user. FIG. 13 illustrates an interface that includes another updated set of smart groups generated by document processing computing platform 110 based on the user input applying the "cormorant" label to several documents. As seen in FIG. 13, a reduced set of smart groups is presented in the interface because fewer documents are still associated with the "to-do" label at this point in the example sequence.

FIG. 14 illustrates an interface that includes a view of documents associated with one of the updated smart groups and shows the "ignore" label being applied to several of the documents from the smart group that has been selected by a user. FIG. 15 illustrates an interface that includes another updated set of smart groups generated by document processing computing platform 110 based on the user input applying the "ignore" label to several documents. As seen in FIG. 15, a reduced set of smart groups is presented in the interface because fewer documents are still associated with the "to-do" label at this point in the example sequence.

Figure 16:
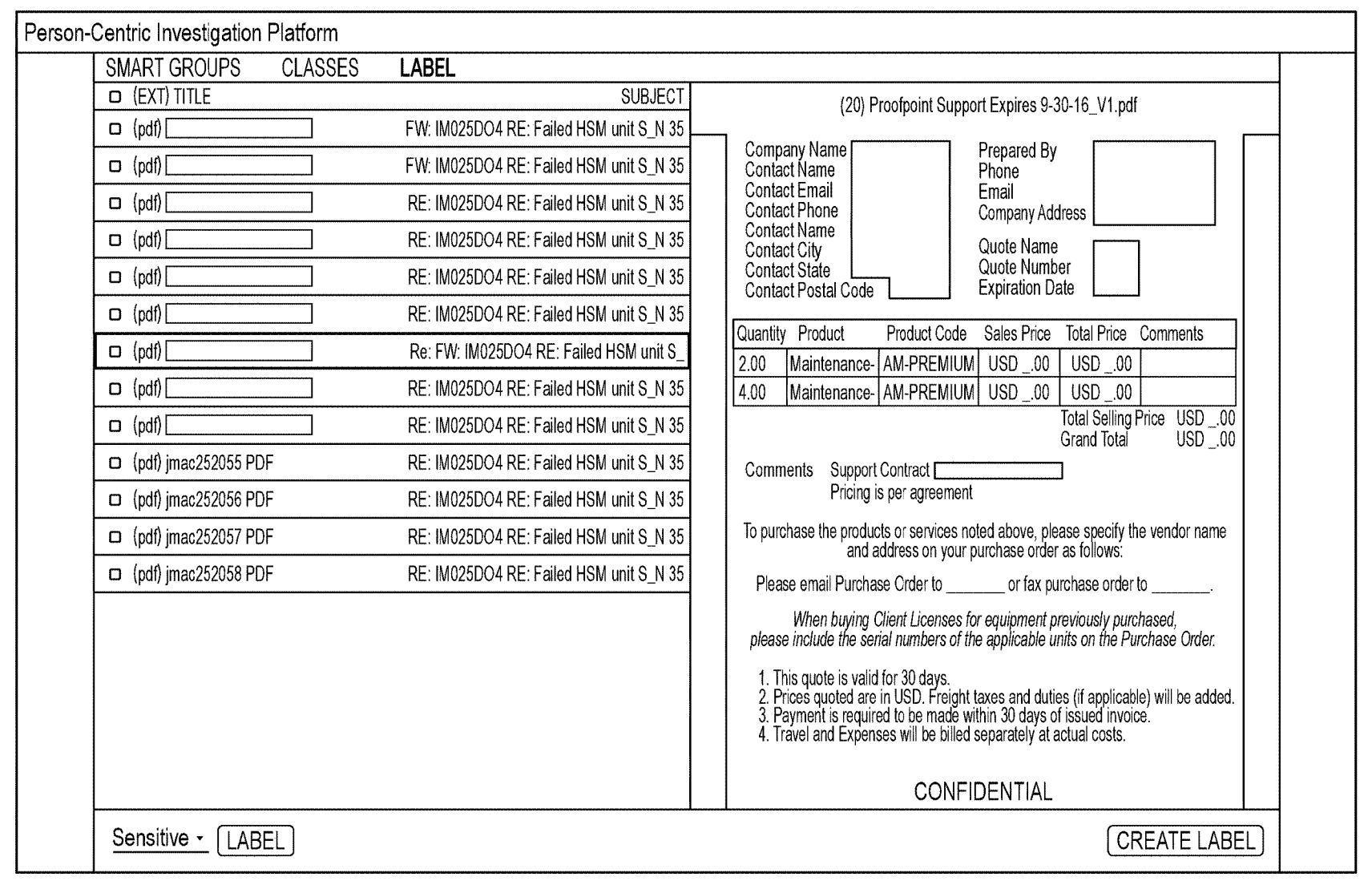

FIG. 16 illustrates an interface that includes a view of documents associated with one of the updated smart groups and shows how contents of individual documents may be displayed in a content pane of the interface. FIG. 17 illustrates an interface in which the "financial" label is being applied to several of the documents from the smart group that has been selected by a user. FIG. 18 illustrates an interface that includes another updated set of smart groups generated by document processing computing platform 110 based on the user input applying the "financial" label to several documents. As seen in FIG. 18, a reduced set of smart groups is presented in the interface because fewer documents are still associated with the "to-do" label at this point in the example sequence.

FIG. 19 illustrates an interface that includes recalculated smart groups generated by document processing computing platform 110 (e.g., based on the labeling operations performed by the user so far at this point in the example sequence). In particular, in recalculating the smart groups shown in the example interface in FIG. 19, document processing computing platform 110 may use supervised learning algorithms to process and/or account for the user input labeling certain documents as belonging to certain categories (e.g., "ignore," "financial," "cormorant," etc.) in the example sequence.

FIG. 20 illustrates an interface in which documents that have been identified by document processing computing platform 110 as possibly corresponding to the "financial" label are presented. FIG. 21 illustrates an interface in which smart groups have again been recalculated based on additional user input. FIG. 22 illustrates an interface in which documents that have been identified by document processing computing platform 110 as possibly corresponding to the "ignore" label are presented. FIG. 23 illustrates an interface in which smart groups have again been recalculated based on additional user input.

Figure 24:
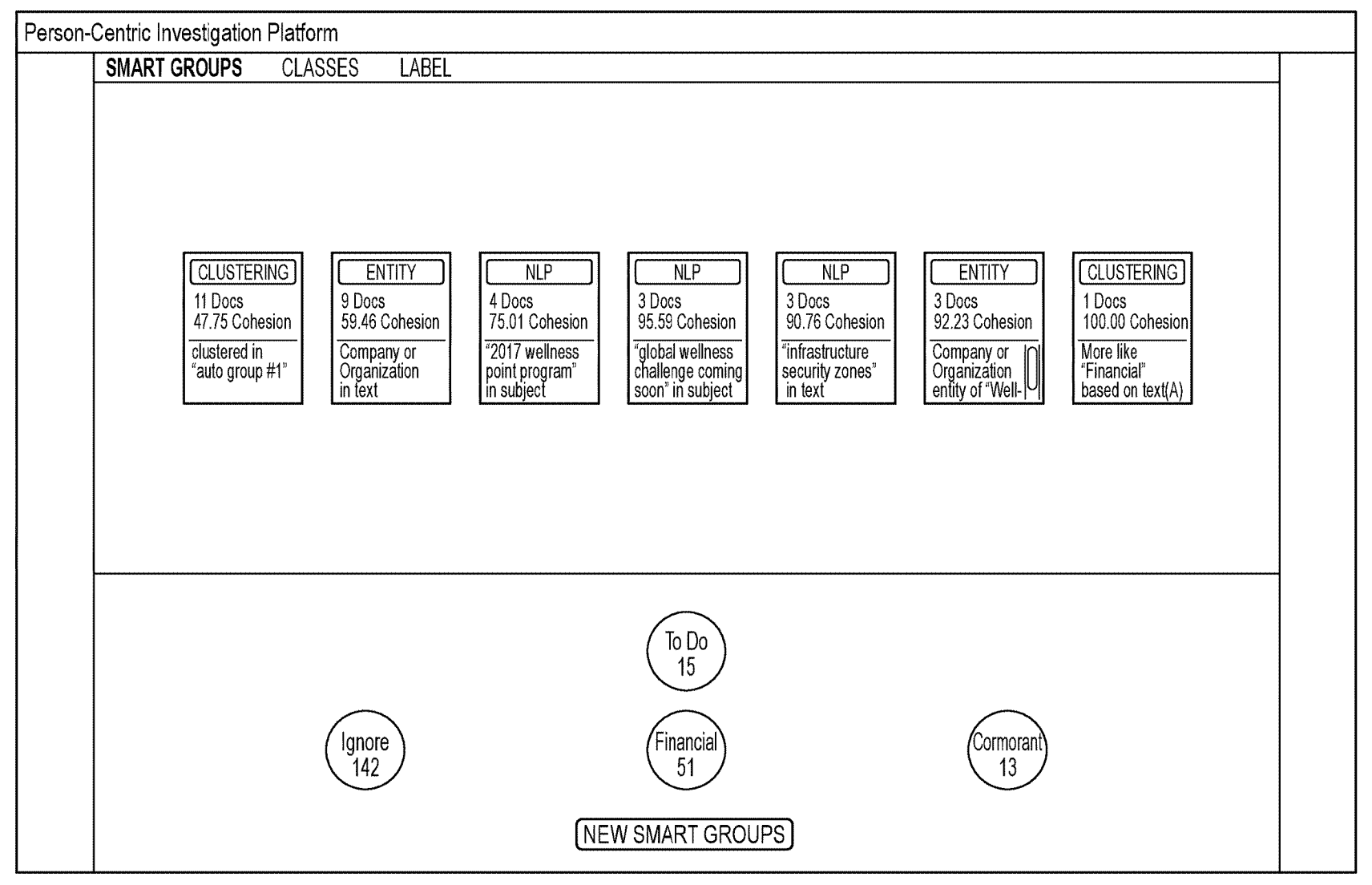
Figure 26:
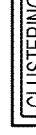

FIG. 24 illustrates another interface that includes recalculated smart groups generated by document processing computing platform 110 (e.g., based on the labeling operations performed by the user so far at this point in the example sequence). FIG. 25 illustrates an interface that includes a view of documents associated with one of the updated smart groups and shows the "ignore" label being applied to several of the documents from the smart group that has been selected by a user. FIG. 26 illustrates an interface that includes another updated set of smart groups generated by document processing computing platform 110 based on the user input applying the "ignore" label to several documents.

FIG. 27 illustrates an interface that includes a view of documents associated with one of the updated smart groups and shows the "cormorant" label being applied to several of the documents from the smart group that has been selected by a user. FIG. 28 illustrates an interface that includes another updated set of smart groups generated by document processing computing platform 110 based on the user input applying the "cormorant" label to several documents.

FIG. 29 illustrates an interface that includes a view of documents remaining in the "to-do" group (which may, e.g., be reviewed and/or evaluated by an analyst user in greater detail). For instance, an analyst user of analyst computing device 120 and/or analyst computing device 130 may interact with document processing computing platform 110 to review these documents in greater detail, because these documents may be of the greatest interest and/or relevance to an investigation being performed by the analyst user of analyst computing device 120 and/or analyst computing device 130.

Figure 30:
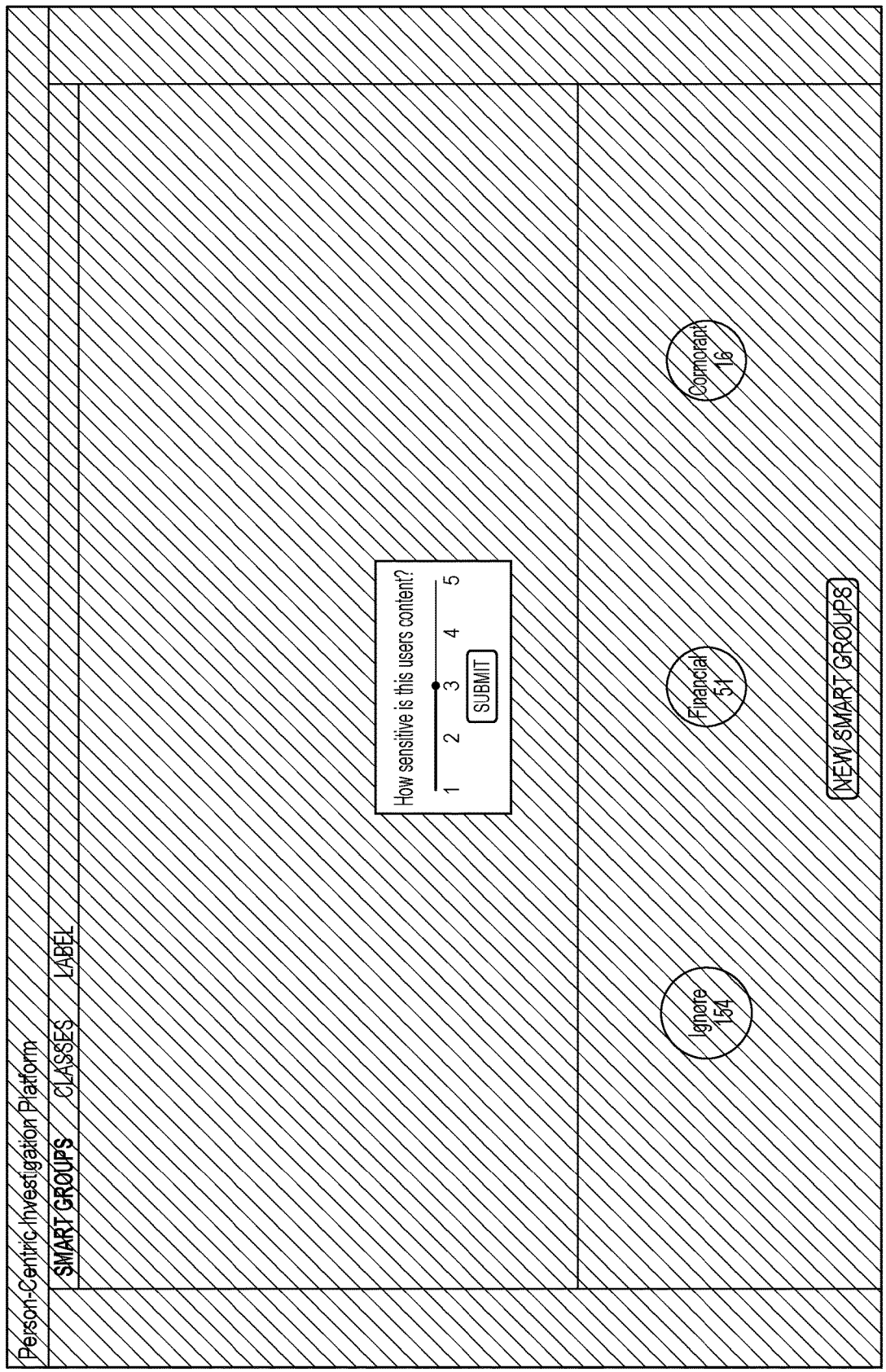

FIG. 30 illustrates an interface in which a sensitivity index is being assigned to the user associated with the corpus of documents (e.g., by an analyst user of analyst computing device 120 and/or analyst computing device 130 interacting with document processing computing platform 110). As discussed above, the sensitivity index may be used by document processing computing platform 110 in calculating a person-centric consequence index for the user associated with the corpus of documents.

As seen in the example event sequence discussed above and illustrated in the example user interfaces, document processing computing platform 110 may enable an analyst user (e.g., of analyst computing device 120 and/or analyst computing device 130) to identify and/or review documents having relevance and/or interest to a particular investigation being conducted by the analyst user. This person-centric, iterative approach (which may, e.g., be implemented by document processing computing platform 110) may greatly increase the review rate of an analyst with respect to a corpus of documents. In some instances, this approach may be employed to quickly determine the consequences to a business if a given person and/or their documents become compromised. In addition, the approach (which may, e.g., be implemented by document processing computing platform 110) is flexible, as custom labels may be created (e.g., "resumes," "invoices," "quotes," etc.), and such labels may be general (e.g., "sensitive," "ignore," etc.) and/or specific (e.g., "finance," "cormorant," etc.).

Figure 31A:
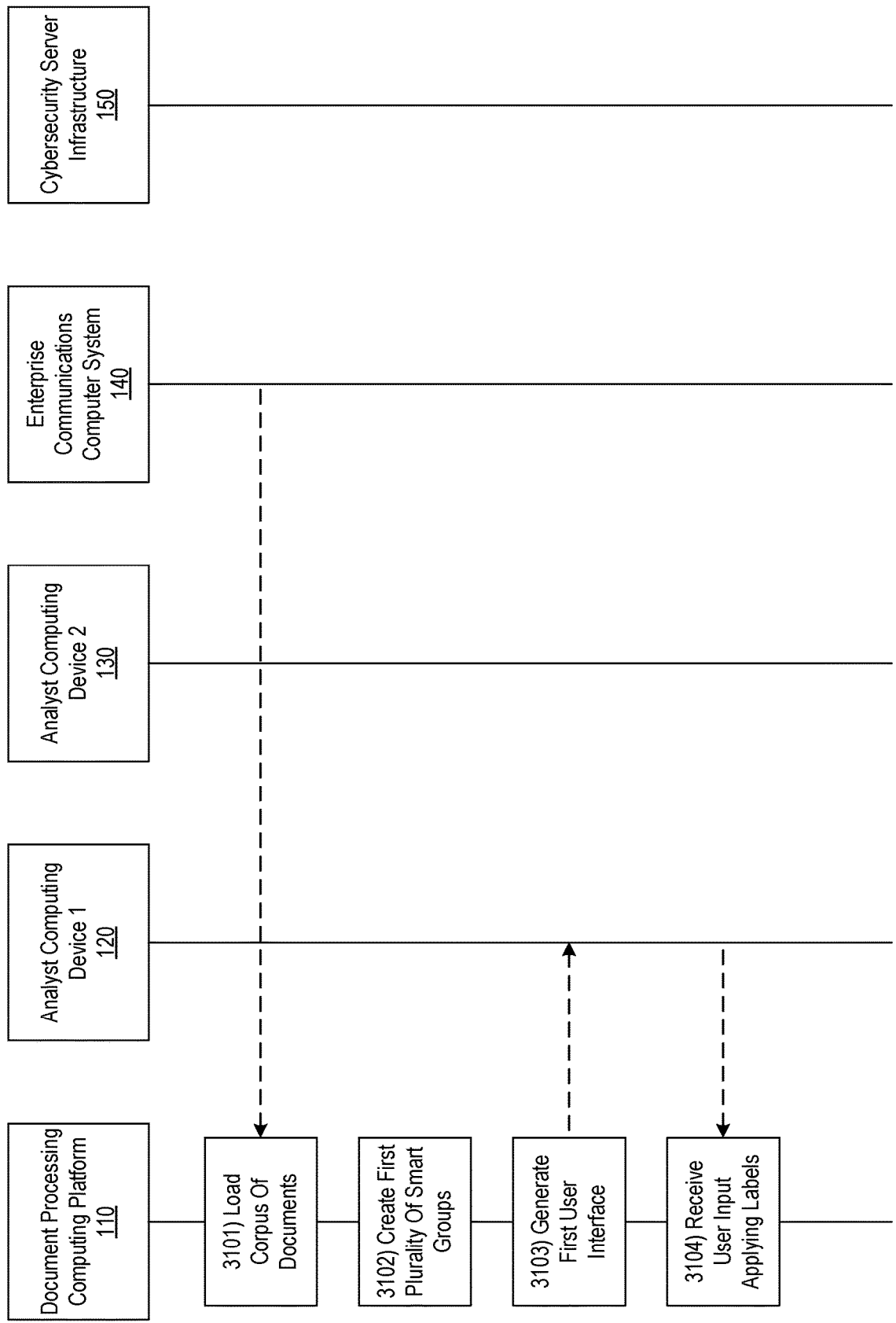
Figure 31C:
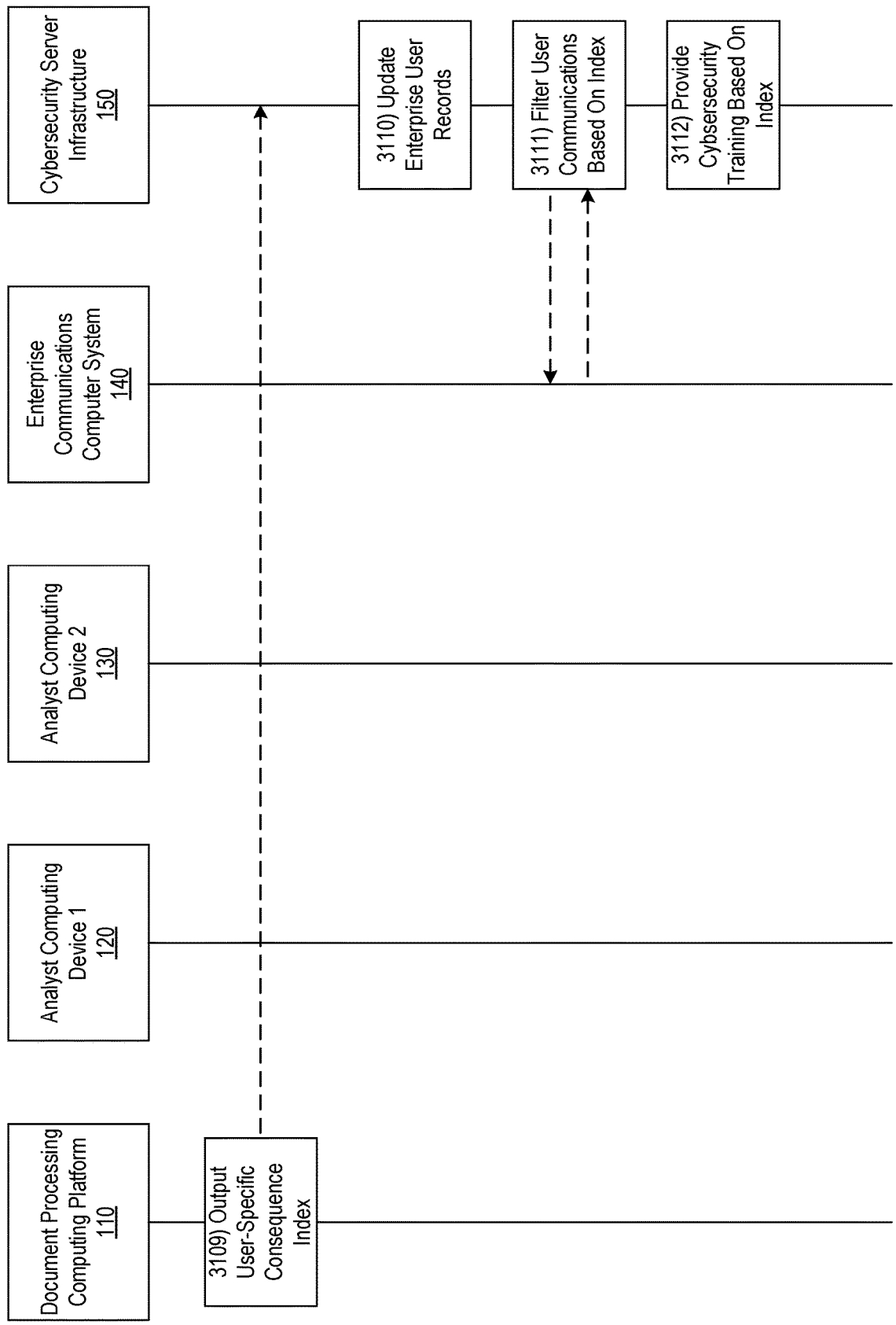

FIGS. 31A-31C depict an illustrative event sequence for using a machine learning system to process a corpus of documents associated with a user to determine a user-specific consequence index in accordance with one or more example embodiments. For instance, the illustrative event sequence shown in FIGS. 31A-31C illustrates how the systems described above may interact with each other when performing one or more of the methods described herein to determine a user-specific consequence index and provide various cybersecurity functions based on the user-specific consequence index.

Referring to FIG. 31A, at step 3101, document processing computing platform 110 may load a corpus of documents. For example, at step 3101, document processing computing platform 110 may load a corpus of documents that includes a plurality of email messages, attachments, and/or other content (e.g., by receiving such content from enterprise communications computer system 140), as in the examples discussed above.

At step 3102, document processing computing platform 110 may create a first plurality of smart groups. For example, at step 3102, document processing computing platform 110 may create a first plurality of smart groups based on the corpus of documents, as in the examples discussed above.

At step 3103, document processing computing platform 110 may generate a first user interface. For example, at step 3103, document processing computing platform 110 may generate a first user interface comprising a representation of the first plurality of smart groups, as in the examples discussed above. In addition, document processing computing platform 110 may send, share, and/or otherwise provide the first user interface to analyst computing device 120.

At step 3104, document processing computing platform 110 may receive user input applying labels to various smart groups. For example, at step 3104, document processing computing platform 110 may receive user input applying one or more labels to one or more documents associated with one or more smart groups of the first plurality of smart groups, as in the examples discussed above. In addition, document processing computing platform 110 may receive such user input from analyst computing device 120.

Referring to FIG. 31B, at step 3105, document processing computing platform 110 may create a second plurality of smart groups. For example, at step 3105, document processing computing platform 110 may create a second plurality of smart groups based on the corpus of documents associated with the user and the user input applying the one or more labels to the plurality of documents associated with the at least one smart group of the first plurality of smart groups, as in the examples discussed above.

At step 3106, document processing computing platform 110 may generate a second user interface. For example, at step 3106, document processing computing platform 110 may generate a second user interface comprising a representation of the second plurality of smart groups, as in the examples discussed above. In addition, document processing computing platform 110 may send, share, and/or otherwise provide the second user interface to analyst computing device 120.

At step 3107, document processing computing platform 110 may receive user input applying a sensitivity value to the corpus of documents based on the evaluation of the smart groups. For example, at step 3107, document processing computing platform 110 may receive user input applying a sensitivity value to one or more documents included in the corpus of documents associated with the user, as in the examples discussed above.

At step 3108, document processing computing platform 110 may calculate a user-specific consequence index (e.g., for the user linked to the corpus of documents). For example, at step 3108, document processing computing platform 110 may calculate a person-centric consequence index for the user based on an analyst-assigned sensitivity value and/or based on unsupervised evaluation of the user's documents by document processing computing platform 110 (e.g., in view of sensitivity values assigned to other, similar documents associated with other users), as in the examples discussed above. For instance, in calculating the person-centric consequence index for the user based on the analyst-assigned sensitivity value and/or based on the unsupervised evaluation of the user's documents by document processing computing platform 110, document processing computing platform 110 may apply one or more classification algorithms and/or other unsupervised learning algorithms to the processed groups of documents in the user's corpus and may automatically score such groups relative to how similar groups of documents were scored for previous users in prior analyses. Subsequently, the machine-determined score may be weighted and/or otherwise modified based on the subjective, analyst-assigned sensitivity value (e.g., the analyst-assigned sensitivity value may be a multiplier for the machine-determined score to produce the final user-specific consequence index).

Referring to FIG. 31C, at step 3109, document processing computing platform 110 may output the user-specific consequence index. For example, at step 3109, document processing computing platform 110 may output the user-specific consequence index by sending, sharing, and/or otherwise transmitting the user-specific consequence index to cybersecurity server infrastructure 150, as in the examples discussed above. By sending, sharing, and/or otherwise transmitting the user-specific consequence index to cybersecurity server infrastructure 150, document processing computing platform 110 may cause cybersecurity server infrastructure 150 to execute, perform, and/or otherwise provide one or more cybersecurity functions.

At step 3110, cybersecurity server infrastructure 150 may update one or more enterprise user records (e.g., based on the user-specific consequence index received from document processing computing platform 110). For example, at step 3110, cybersecurity server infrastructure 150 may recalculate, reevaluate, and/or otherwise update one or more very attacked persons (VAP) lists. Such VAP lists may, for instance, be maintained by cybersecurity server infrastructure 150 and may be used to track and/or identify users of an enterprise organization (e.g., the enterprise organization operating document processing computing platform 110 and/or cybersecurity server infrastructure 150) who have a relatively higher risk of being targeted for and/or falling victim to phishing attempts, malware, and/or other cybersecurity attacks than other users of the enterprise organization. The users included on such a VAP list may, for instance, be targeted for attack because they have relatively greater access to sensitive and/or confidential information than other users of the enterprise organization, relatively more power to authorize contracts, invoices, and/or transactions than other users of the enterprise organization, or the like. Thus, cybersecurity server infrastructure 150 may update such a VAP list based on receiving the user-specific consequence index from document processing computing platform 110 because the user linked to the corpus of documents may be added to or removed from the VAP list by cybersecurity server infrastructure 150 based on their user-specific consequence index.

At step 3111, cybersecurity server infrastructure 150 may filter one or more communications (e.g., to and/or from the user linked to the corpus of documents). For example, at step 3111, cybersecurity server infrastructure 150 may filter, based on the user-specific consequence index received from document processing computing platform 110, one or more email messages and/or other communications that are being sent to and/or being sent from the user linked to the corpus of documents. In filtering such communications, cybersecurity server infrastructure 150 may, for instance, apply different filtering rules depending on whether the user-specific consequence index received from document processing computing platform 110 exceeds one or more thresholds corresponding to different filtering rule sets. For example, if the user's consequence index corresponds to the user having relatively low access to confidential enterprise information, then cybersecurity server infrastructure 150 may apply little if any filtering to the user's communications. Alternatively, if the user's consequence index corresponds to the user having relatively high access to confidential enterprise information, then cybersecurity server infrastructure 150 may apply relatively heavy filtering to the user's communications. For instance, cybersecurity server infrastructure 150 may scan every inbound communication to the user for potential phishing, malware, and/or other cybersecurity risks, generate and insert embedded warnings and/or banners for the user if such risks are detected, and/or generate and send one or more alerts to network administrators if such risks are detected. Additionally or alternatively, cybersecurity server infrastructure 150 may scan every outbound communication from the user for potential violations of an enterprise data loss prevention (DLP) policy and may generate and send one or more alerts (e.g., to the user and/or to one or more network administrators) if such violations are detected.

At step 3112, cybersecurity server infrastructure 150 may provide cybersecurity training based on the user-specific consequence index received from document processing computing platform 110. For example, at step 3112, cybersecurity server infrastructure 150 may provide cybersecurity training to the user linked to the corpus of documents, based on the user-specific consequence index received from document processing computing platform 110. In providing such cybersecurity training, cybersecurity server infrastructure 150 may, for instance, apply different cybersecurity training rules depending on whether the user-specific consequence index received from document processing computing platform 110 exceeds one or more thresholds corresponding to different cybersecurity training rule sets. For example, if the user's consequence index corresponds to the user having relatively low access to confidential enterprise information, then cybersecurity server infrastructure 150 may provide the user with a first level of cybersecurity training (which may, e.g., involve completing one or more mandatory online training modules dealing with avoiding phishing, malware, and/or other cybersecurity risks and/or one or more optional training modules). Alternatively, if the user's consequence index corresponds to the user having relatively high access to confidential enterprise information, then cybersecurity server infrastructure 150 may provide the user with a second level of cybersecurity training (which may, e.g., be more in-depth, detailed, and/or rigorous than the first level of cybersecurity training). For instance, if the user's consequence index corresponds to the user having relatively high access to confidential enterprise information, then cybersecurity server infrastructure 150 may provide the user with cybersecurity training that involves mandatory online training modules on procedures for properly storing and/or accessing confidential information, phishing simulations, best practices for safely handling and opening attachments on secure systems, and/or the like, instead of or in addition to the training modules associated with the first level of cybersecurity training.

In this way, cybersecurity server infrastructure 150 may provide various cybersecurity functions based on the user-specific consequence index received from document processing computing platform 110. As a result, an enterprise organization using document processing computing platform 110 and/or cybersecurity server infrastructure 150 may be able to understand, on a person-by-person basis, the risk posed by different users and their electronic information being compromised as a result of phishing, malware, or other attack. In addition, the automated classification models executed by document processing computing platform 110 may become better at learning to identify sensitive content over time, such that an enterprise analyst user may be able to obtain a quick impression of a given user's consequence index (e.g., based solely on automated analysis being performed by the classification model(s)) and/or may use the smart groups and analysis techniques described above to form a more nuanced understanding of the user's consequence index. Further, the classification models executed by document processing computing platform 110 may learn to replicate the subjective conclusions being drawn by a human analyst (e.g., by virtue of the supervised learning algorithms) as different corpuses of documents linked to different users are investigated, such that the automated portion of the analysis may become even more effective over time.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface; and
memory storing computer-readable instructions that, when executed by the at least one processor, cause the computing platform to:
load a corpus of documents associated with a particular user;
create a first plurality of smart groups based on the corpus of documents associated with the particular user;
generate a first user interface comprising a representation of the first plurality of smart groups;
receive user input applying one or more labels to a plurality of documents associated with at least one smart group of the first plurality of smart groups;
create a second plurality of smart groups based on the corpus of documents associated with the particular user and the user input applying the one or more labels to the plurality of documents associated with the at least one smart group of the first plurality of smart groups;
generate a second user interface comprising a representation of the second plurality of smart groups;
receive, via the second user interface, user input applying a sensitivity value to one or more documents associated with at least one smart group of the second plurality of smart groups, the sensitivity value indicating a sensitivity of a respective document of the one or more documents associated with the at least one smart group of the second plurality of smart groups;
calculate a person-centric consequence index for the particular user associated with the corpus of documents based on the user input applying the sensitivity value to the one or more documents associated with the at least one smart group of the second plurality of smart groups;
output the person-centric consequence index calculated for the particular user associated with the corpus of documents to an enterprise risk classification system; and
update an attacked persons list based on the person-centric consequence index for the particular user associated with the corpus of documents in the enterprise risk classification system, the attacked persons list identifying users of an enterprise organization at risk of being targeted in cybersecurity attacks.

2. The computing platform of claim 1, wherein loading the corpus of documents associated with the particular user comprises receiving a plurality of email messages associated with the user from an enterprise communications computer system.

3. The computing platform of claim 1, wherein creating the first plurality of smart groups based on the corpus of documents associated with the particular user comprises executing multiple unsupervised machine-learning algorithms to produce the first plurality of smart groups.

4. The computing platform of claim 3, wherein executing the multiple unsupervised machine-learning algorithms to produce the first plurality of smart groups comprises executing one or more clustering algorithms.

5. The computing platform of claim 1, wherein the memory stores additional computer-readable instructions that, when executed by the at least one processor, cause the computing platform to:
monitor user interactions involving the one or more smart groups of the first plurality of smart groups and one or more smart groups of the second plurality of smart groups; and
assign at least one priority value to a first set of smart groups of the one or more smart groups of the first plurality of smart groups and the one or more smart groups of the second plurality of smart groups based on the monitored user interactions.

6. The computing platform of claim 1, wherein creating the second plurality of smart groups based on the corpus of documents associated with the particular user and the user input applying the one or more labels to the plurality of documents associated with the at least one smart group of the first plurality of smart groups comprises creating one or more smart groups of the second plurality of smart groups using a supervised machine learning mechanism.

7. The computing platform of claim 1, wherein the memory stores additional computer-readable instructions that, when executed by the at least one processor, cause the computing platform to:
output data associated with the second plurality of smart groups to an e-discovery platform application.

8. The computing platform of claim 1, wherein the memory stores additional computer-readable instructions that, when executed by the at least one processor, cause the computing platform to:
output data associated with the second plurality of smart groups to a compliance supervision application.

9. The computing platform of claim 1, wherein the memory stores additional computer-readable instructions that, when executed by the at least one processor, cause the computing platform to:
output data associated with the second plurality of smart groups to a malicious object or event labeling application.

10. The computing platform of claim 1, further including instructions that, when executed, cause the computing platform to:
filter one or more email messages sent to or from the user associated with the corpus of documents based on the person-centric consequence index for the user associated with the corpus of documents.

11. The computing platform of claim 1, further including instructions that, when executed, cause the computing platform to:
identify cybersecurity training for the particular user based on the person-centric consequence index of the particular user associated with the corpus of documents; and
provide the identified cybersecurity training to the particular user associated with the corpus of documents.

12. A method, comprising:
at a computing platform comprising at least one processor, a communication interface, and memory:
loading, by the at least one processor, a corpus of documents associated with a particular user;
creating, by the at least one processor, a first plurality of smart groups based on the corpus of documents associated with the particular user;
generating, by the at least one processor, a first user interface comprising a representation of the first plurality of smart groups;
receiving, by the at least one processor, user input applying one or more labels to a plurality of documents associated with at least one smart group of the first plurality of smart groups;
creating, by the at least one processor, a second plurality of smart groups based on the corpus of documents associated with the particular user and the user input applying the one or more labels to the plurality of documents associated with the at least one smart group of the first plurality of smart groups;
generating, by the at least one processor, a second user interface comprising a representation of the second plurality of smart groups;
receiving, by the at least one processor and via the second user interface, user input applying a sensitivity value to one or more documents associated with at least one smart group of the second plurality of smart groups, the sensitivity value indicating a sensitivity of a respective document of the one or more documents associated with the at least one smart group of the second plurality of smart groups;
calculating, by the at least one processor, a person-centric consequence index for the particular user associated with the corpus of documents based on the user input applying the sensitivity value to the one or more documents associated with the at least one smart group of the second plurality of smart groups;
outputting, by the at least one processor, the person-centric consequence index calculated for the particular user associated with the corpus of documents to an enterprise risk classification system; and
updating, by the at least one processor, an attacked persons list based on the person-centric consequence index for the particular user associated with the corpus of documents in the enterprise risk classification system, the attacked persons list identifying users of an enterprise organization at risk of being targeted in cybersecurity attacks.

13. The method of claim 12, wherein loading the corpus of documents associated with the particular user comprises receiving a plurality of email messages associated with the user from an enterprise communications computer system.

14. The method of claim 12, wherein creating the first plurality of smart groups based on the corpus of documents associated with the particular user comprises executing multiple unsupervised machine-learning algorithms to produce the first plurality of smart groups.

15. The method of claim 14, wherein executing the multiple unsupervised machine-learning algorithms to produce the first plurality of smart groups comprises executing one or more clustering algorithms.

16. The method of claim 12, comprising:
monitoring, by the at least one processor, user interactions involving the one or more smart groups of the first plurality of smart groups and one or more smart groups of the second plurality of smart groups; and
assigning, by the at least one processor, at least one priority value to a first set of smart groups of the one or more smart groups of the first plurality of smart groups and the one or more smart groups of the second plurality of smart groups based on the monitored user interactions.

17. The method of claim 12, wherein creating the second plurality of smart groups based on the corpus of documents associated with the particular user and the user input applying the one or more labels to the plurality of documents associated with the at least one smart group of the first plurality of smart groups comprises creating one or more smart groups of the second plurality of smart groups using a supervised machine learning mechanism.

18. One or more non-transitory computer-readable media storing instructions that, when executed by a computing platform comprising at least one processor, a communication interface, and memory, cause the computing platform to:

load a corpus of documents associated with a particular user;

create a first plurality of smart groups based on the corpus of documents associated with the particular user;

generate a first user interface comprising a representation of the first plurality of smart groups;

receive user input applying one or more labels to a plurality of documents associated with at least one smart group of the first plurality of smart groups;

create a second plurality of smart groups based on the corpus of documents associated with the particular user and the user input applying the one or more labels to the plurality of documents associated with the at least one smart group of the first plurality of smart groups;

generate a second user interface comprising a representation of the second plurality of smart groups;

receive, via the second user interface, user input applying a sensitivity value to one or more documents associated with at least one smart group of the second plurality of smart groups, the sensitivity value indicating a sensitivity of a respective document of the one or more documents associated with the at least one smart group of the second plurality of smart groups;

calculate a person-centric consequence index for the particular user associated with the corpus of documents based on the user input applying the sensitivity value to the one or more documents associated with the at least one smart group of the second plurality of smart groups;

output the person-centric consequence index calculated for the particular user associated with the corpus of documents to an enterprise risk classification system; and update an attacked persons list based on the person-centric consequence index for the particular user associated with the corpus of documents in the enterprise risk classification system, the attacked persons list identifying users of an enterprise organization at risk of being targeted in cybersecurity attacks.

* * * * *